(12) United States Patent
Raudsepp et al.

(10) Patent No.: US 11,135,670 B2
(45) Date of Patent: Oct. 5, 2021

(54) METHOD AND SYSTEM FOR SUBMERGED ARC WELDING

(71) Applicant: ESAB AB, Gothenburg (SE)

(72) Inventors: Hannes Raudsepp, Solna (SE); Martin Andersson, Mariestad (SE); Tomas Johansson, Laxa (SE); Rikard Ljungkvist, Kumla (SE)

(73) Assignee: ESAB AB, Gothenburg (SE)

( * ) Notice: Subject to any disclaimer, the term of this patent is extended or adjusted under 35 U.S.C. 154(b) by 363 days.

(21) Appl. No.: 16/170,128

(22) Filed: Oct. 25, 2018

(65) Prior Publication Data

US 2019/0061040 A1 Feb. 28, 2019

Related U.S. Application Data

(62) Division of application No. 14/421,724, filed as application No. PCT/EP2012/003461 on Aug. 14, 2012, now Pat. No. 10,137,521.

(51) Int. Cl.
*B23K 9/18* (2006.01)
*B23K 9/12* (2006.01)

(52) U.S. Cl.
CPC .............. *B23K 9/188* (2013.01); *B23K 9/121* (2013.01); *B23K 9/124* (2013.01)

(58) Field of Classification Search
CPC ........ B23K 9/24; B23K 9/122; B23K 9/1735; B23K 9/121; B23K 9/124; B23K 9/188
(Continued)

(56) References Cited

U.S. PATENT DOCUMENTS

| 2,681,970 A | * | 6/1954 | Koopman | B23K 9/173 |
| | | | | 219/74 |
| 2,932,723 A | * | 4/1960 | Lesnewich | B23K 9/173 |
| | | | | 219/74 |

(Continued)

FOREIGN PATENT DOCUMENTS

| CN | 102248253 A | 11/2011 |
| CN | 202180285 U | 4/2012 |

(Continued)

OTHER PUBLICATIONS

First Examination Report for Indian Patent Application No. 304/MUMNP/2015 dated Sep. 30, 2019 with English translation, 7 pages.

(Continued)

*Primary Examiner* — Jimmy Chou
(74) *Attorney, Agent, or Firm* — Edell, Shapiro & Finnan, LLC

(57) ABSTRACT

A submerged arc welding apparatus includes a first wire feeder feeding a first hot wire towards a work piece; a first contact tube transferring current to the first hot wire for arc generation to create a weld puddle; a second wire feeder feeding a cold wire at a variable feed speed towards the weld puddle; one or more sensors configured to continuously measure, during a welding phase, at least a first active welding parameter related to at least the first hot wire; and a control unit. The control unit is configured to determine different target values for the variable feed speed of the cold wire based on different values of the at least a first active welding parameter such that a different target value for the variable feed speed of the cold wire is determined according to a different value of the at least a first active welding parameter.

20 Claims, 9 Drawing Sheets

(58) Field of Classification Search
USPC ...... 219/73, 72, 74, 73.11, 73.2, 73.21, 126, 219/125.12, 59.1, 60 A, 60 R
See application file for complete search history.

(56) References Cited

U.S. PATENT DOCUMENTS

| | | | | |
|---|---|---|---|---|
| 2,938,107 A * | 5/1960 | Pease | B23K 9/0017 | 219/137.71 |
| 3,185,814 A * | 5/1965 | Rossner | B23K 9/30 | 219/76.14 |
| 3,223,818 A * | 12/1965 | Chyle | B23K 35/304 | 219/73 |
| 3,274,371 A * | 9/1966 | Saenger, Jr. | B23K 9/04 | 219/137 R |
| 3,293,400 A * | 12/1966 | Brogdon | B23K 9/182 | 219/73 |
| 3,428,774 A * | 2/1969 | Faust | B23K 9/30 | 219/76.15 |
| 3,549,856 A * | 12/1970 | Saenger, Jr. | B23K 9/0737 | 219/137 R |
| 3,617,690 A * | 11/1971 | Terai | B23K 9/0213 | 219/137 R |
| 4,159,410 A * | 6/1979 | Cooper | B23K 9/1336 | 219/121.45 |
| 4,246,463 A * | 1/1981 | Shutt | B23K 9/188 | 219/122 |
| 4,247,751 A * | 1/1981 | Ashton | B23K 9/125 | 219/130.31 |
| 4,336,441 A * | 6/1982 | Godai | B23K 9/23 | 219/137 WM |
| 4,456,814 A * | 6/1984 | Mizuno | B23K 9/073 | 219/130.32 |
| 4,467,176 A * | 8/1984 | Mizuno | B23K 9/1093 | 219/130.5 |
| 4,493,971 A * | 1/1985 | Nawa | B23K 9/167 | 219/136 |
| 4,521,664 A * | 6/1985 | Miller | B23K 31/025 | 219/125.12 |
| 4,584,457 A * | 4/1986 | Dilthey | B23K 9/0735 | 219/130.21 |
| 4,780,594 A * | 10/1988 | Rothermel | B23K 9/124 | 219/137.71 |
| 4,801,781 A * | 1/1989 | Hori | B23K 9/1093 | 219/137.71 |
| 4,806,735 A * | 2/1989 | Ditschun | B23K 9/091 | 219/130.31 |
| 4,902,873 A * | 2/1990 | Ivannikov | B23K 9/1735 | 219/137 R |
| 4,904,843 A * | 2/1990 | Hori | B23K 9/091 | 219/137 PS |
| 4,973,821 A * | 11/1990 | Martin | B23K 9/1062 | 219/130.51 |
| 5,124,527 A * | 6/1992 | Takano | B23K 9/164 | 219/137.2 |
| 5,140,140 A * | 8/1992 | Pollack | B23K 9/188 | 219/137 PS |
| 5,155,330 A * | 10/1992 | Fratiello | B23K 9/1735 | 219/137 R |
| 5,214,265 A * | 5/1993 | Pollack | B23K 9/188 | 219/130.1 |
| 5,958,261 A * | 9/1999 | Offer | B23K 9/0213 | 219/75 |
| 5,977,504 A * | 11/1999 | Offer | B23K 26/211 | 219/136 |
| 5,994,659 A * | 11/1999 | Offer | B23K 9/1093 | 219/136 |
| 6,023,043 A * | 2/2000 | Manabe | B23K 9/08 | 219/123 |
| 6,040,545 A * | 3/2000 | Taki | B23K 9/0213 | 219/137 R |
| 6,127,651 A * | 10/2000 | Burgoon | B23K 9/1093 | 219/137 R |
| 6,498,321 B1 * | 12/2002 | Fulmer | B23K 9/1056 | 219/130.33 |
| 6,744,003 B1 * | 6/2004 | Ono | B23K 3/025 | 219/85.16 |
| 6,884,959 B2 * | 4/2005 | Gandy | B23K 9/188 | 219/76.14 |
| 7,408,130 B2 * | 8/2008 | Sonoda | B23K 9/0675 | 219/121.63 |
| 8,895,896 B2 * | 11/2014 | O'Donnell | B23K 9/1735 | 219/137.71 |
| 9,216,470 B2 | 12/2015 | Berg | | |
| 10,137,521 B2 * | 11/2018 | Raudsepp | B23K 9/121 | |
| 2002/0117488 A1 * | 8/2002 | Arndt | B23K 9/167 | 219/125.1 |
| 2002/0117489 A1 * | 8/2002 | Arndt | B23K 9/167 | 219/130.5 |
| 2003/0052110 A1 * | 3/2003 | Gandy | B23K 9/188 | 219/137.7 |
| 2003/0062355 A1 * | 4/2003 | Ikegami | B23K 9/1735 | 219/137 PS |
| 2004/0173591 A1 * | 9/2004 | Knoener | B23K 9/0953 | 219/130.5 |
| 2006/0016792 A1 * | 1/2006 | Uecker | B23K 9/125 | 219/137.71 |
| 2007/0145028 A1 * | 6/2007 | Artelsmair | B23K 26/348 | 219/137.71 |
| 2007/0158324 A1 * | 7/2007 | O'Donnell | B23K 9/1068 | 219/137.71 |
| 2008/0083716 A1 * | 4/2008 | Shigeyoshi | B23K 9/0216 | 219/125.12 |
| 2008/0142493 A1 * | 6/2008 | Uecker | B23K 9/125 | 219/130.4 |
| 2008/0190900 A1 * | 8/2008 | Zhang | B23K 9/1675 | 219/121.45 |
| 2008/0296277 A1 * | 12/2008 | McAninch | B23K 9/1093 | 219/136 |
| 2009/0200281 A1 * | 8/2009 | Hampton | B23K 9/10 | 219/130.33 |
| 2010/0059493 A1 * | 3/2010 | McAninch | B23K 9/133 | 219/137 PS |
| 2010/0270278 A1 * | 10/2010 | Daniel | B23K 9/126 | 219/130.21 |
| 2011/0000890 A1 * | 1/2011 | Arjakine | B23P 6/002 | 219/75 |
| 2011/0036814 A1 * | 2/2011 | Ishigami | B23K 9/188 | 219/73 |
| 2011/0297658 A1 * | 12/2011 | Peters | B23K 9/125 | 219/162 |
| 2012/0043307 A1 * | 2/2012 | Lennartsson | B23K 9/188 | 219/137 R |
| 2012/0298639 A1 * | 11/2012 | Wang | B23K 9/133 | 219/121.64 |
| 2012/0312795 A1 * | 12/2012 | Suzuki | B23K 9/121 | 219/137 R |
| 2013/0043219 A1 * | 2/2013 | Peters | B23K 9/0671 | 219/72 |
| 2014/0027413 A1 * | 1/2014 | Lin | B23K 26/348 | 219/121.64 |
| 2014/0251968 A1 * | 9/2014 | Peters | B23K 9/0738 | 219/130.21 |
| 2014/0263228 A1 * | 9/2014 | Peters | B23K 9/1735 | 219/130.1 |
| 2014/0263229 A1 * | 9/2014 | Peters | B23K 9/1006 | 219/130.1 |
| 2014/0263230 A1 * | 9/2014 | Peters | B23K 9/1043 | 219/130.1 |
| 2014/0263231 A1 * | 9/2014 | Peters | B23K 9/1735 | 219/130.1 |
| 2014/0263232 A1 * | 9/2014 | Peters | B23K 9/1043 | 219/130.1 |
| 2014/0263233 A1 * | 9/2014 | Peters | B23K 9/095 | 219/130.1 |
| 2014/0263234 A1 * | 9/2014 | Peters | B23K 9/0216 | 219/130.1 |
| 2014/0263246 A1 * | 9/2014 | Brice | B23K 15/0093 | 219/137 R |

(56) References Cited

U.S. PATENT DOCUMENTS

| | | | |
|---|---|---|---|
| 2014/0291297 A1* | 10/2014 | Chen | B23K 10/02 219/74 |
| 2015/0014283 A1* | 1/2015 | Peters | B23K 26/32 219/74 |
| 2015/0028010 A1* | 1/2015 | Peters | B23K 9/093 219/130.51 |
| 2015/0028011 A1* | 1/2015 | Peters | B23K 9/09 219/130.51 |
| 2015/0028012 A1* | 1/2015 | Peters | B23K 9/091 219/130.51 |
| 2015/0090703 A1* | 4/2015 | Peters | B23K 26/32 219/130.21 |
| 2015/0151375 A1* | 6/2015 | Peters | B23K 9/0953 219/130.21 |
| 2015/0158105 A1* | 6/2015 | Peters | B23K 9/0671 219/130.31 |
| 2015/0158106 A1* | 6/2015 | Peters | B23K 9/173 219/130.32 |
| 2015/0158108 A1* | 6/2015 | Peters | B23K 9/042 219/130.1 |
| 2015/0183044 A1* | 7/2015 | Peters | B23K 26/1423 219/130.32 |
| 2015/0273614 A1* | 10/2015 | Raudsepp | B23K 9/0732 219/73 |
| 2015/0343550 A1* | 12/2015 | Raudsepp | B23K 9/1068 219/130.1 |

FOREIGN PATENT DOCUMENTS

| | | |
|---|---|---|
| EP | 1338369 A1 | 8/2003 |
| JP | S63-43773 A | 2/1988 |
| JP | H02-205267 A | 8/1990 |
| JP | H05-96374 A | 4/1993 |
| JP | 2013538691 A | 10/2013 |
| WO | 2010112068 A1 | 10/2010 |
| WO | 2012041375 A1 | 4/2012 |

OTHER PUBLICATIONS

Notice of Preliminary Rejection for KR Patent Application No. 10-2015-7006528 dated May 9, 2018 with translations.

Dilthey U, et al, "Verbesserung der Heissrisssicherheit beim Schweissen von Nickel-Basislegierungen durch UP-Kaldrahtschweissverfahren," Schweissen Und Schneiden, DVS Verlag, Dusseldorf, DE, 60, 2, Feb. 1, 2008, 88-96.

\* cited by examiner

METHOD AND SYSTEM FOR SUBMERGED ARC WELDING

CROSS-REFERENCE TO RELATED APPLICATIONS

This application is a divisional of U.S. patent application Ser. No. 14/421,724, filed on Mar. 10, 2015, which is a National State Entry of PCT/EP2012/003461, filed Aug. 14, 2012, the disclosures of all of which are incorporated herein by reference in their entirety.

TECHNICAL FIELD

The invention relates to a method for submerged arc welding according to the preamble of claim 1 and a submerged arc welding system according to the preamble of claim 13.

BACKGROUND OF THE INVENTION

Submerged arc welding (SAW) is a welding method characterized by high productivity and quality, often used for longer welding seams in thicker materials.

It is well known to use a consumable electrode to conduct a weld current through a work piece. The weld current forms an arc between the consumable electrode and the work piece to create a weld puddle on the work piece. This consumable electrode is known as a hot wire.

Submerged arc welding is characterized in that the melted material and the arcs are protected beneath a layer of pulverized flux. The flux melts in part during the process, thus creating a protecting layer of slag on the weld puddle. The electrical current used in the process is relatively high, usually within 300-1500 Ampere per electrode. The electrodes used in submerged arc welding are usually 2.5-6 mm in diameter.

Fluxes used in submerged arc welding are granular fusible minerals typically containing oxides of manganese, silicon, titanium, aluminium, calcium, zirconium, magnesium and other compounds such as calcium fluoride. The flux is specially formulated to be compatible with a given electrode wire type so that the combination of flux and wire yields desired mechanical properties. All fluxes react with the weld puddle to produce the weld metal chemical composition and mechanical properties. It is common practice to refer to fluxes as 'active' if they add manganese and silicon to the weld. The amount of manganese and silicon added is influenced by the arc voltage and the welding current level.

It is desirable to increase the productivity of a SAW process. This can be done by increasing the weld speed and the deposition rate, i.e. the rate at which weld metal is actually deposited onto the work piece surface. The heat input should be kept on a level that preserves the mechanical properties of the welded parent material and the weld should have mechanical properties of a certain level.

Heat input can be calculated as follows:

$$Q = \eta_{SAW} \frac{I \times U \times 60}{v} 10^{-3}, \quad (1)$$

Where Q (kJ/mm) is heat input, $\eta_{SAW}$ is an efficiency factor, I (A) is welding current, U (V) is arc voltage and v (mm/min) is welding speed.

One way to increase the deposition rate is to use multiple hot wires in a single weld puddle. Usually 2-3 hot wires are used, however, usage of up to 6 hot wires is known. Using more than one hot wire in a single weld puddle enables increased deposition rates and therefore improves economy of welding. It also enables improved weld quality due to the possibility of assigning the leading and trailing hot wires with different tasks.

The hot wires can be arranged in various settings or formations. For instance, the hot wires can be positioned shifted out in a transverse direction with respect to a welding direction or be positioned at a distance from each other in the welding direction, or a combination thereof. In the event two or more hot wires are shifted out in the transverse direction, they may be positioned side by side. This is used for surface welding or specific joints where a wide joint is needed. Side by side welding leads to lower penetration and more width.

Alternatively, the hot wires are positioned at a distance from each other in the welding direction. A hot wire located first in the direction of welding is normally referred to as a leading hot wire and a hot wire located behind the leading hot wire is normally referred to as a trailing hot wire. Normally, the leading hot wire and the trailing hot wires serve different roles in the welding process. It is for instance known to control the leading hot wire such that a desired degree of penetration is obtained whereas the trailing hot wire controls weld bead appearance, contour and fill.

It is also possible to separate the hot wires far from one another, in which case the weld puddle generated by the leading hot wire may solidify before a second hot wire has reached the puddle. In this event, the two hot wires more or less perform the task of two consecutive welding passes.

Another way to improve the deposition rate is to add one or more consumable electrodes that melt without formation of arcs. These electrodes are called cold wires. A cold wire is continuously fed towards a molten weld puddle in close proximity to one or more hot wires, where the cold wire is melted by heat generated by said hot wires. A current may be applied to a cold wire for heating thereof.

It is known from, for example, WO 2012/041375 A1 to manipulate the cold wire feed speed independently from the hot wire feed speed. It is also known from JP 2205267 to control the feed speed of a filler wire in dependence on the shape of the groove to maintain a certain melt pool length.

The introduction of cold wire material into the weld puddle may lead to improved control of the composition of the weld alloy, which may lead to improved welds. It is preferable to introduce the cold wire in the vicinity of and preferably into an arc generated by a hot wire (even more preferably in the vicinity of or into arcs generated by a plurality of hot wires). Furthermore, feeding of cold wire material into the weld puddle may lead to an increase of productivity of up to 100% with optimized welding parameters. In other words, a cold wire allows for higher deposition rates without increasing the heat input.

A problem associated with cold wires is that they sometimes increase the welding process instability when the cold wire is not melted at an even pace, or strike the parent material through the melt pool. This can cause weld defects and inclusions in the weld metal of unmelted cold wire material.

A first object of the invention is to provide a method for submerged arc welding using at least one cold wire, which method ensures a stable welding process and improved weld quality.

A second object of the invention is to provide a submerged arc welding system adapted to use at least one cold wire, which system ensures a stable welding process and improved weld quality.

BRIEF DESCRIPTION OF THE INVENTION

A hot wire is a consumable electrode connected to a power source to maintain an arc between said consumable electrode and a work piece.

A cold wire is a consumable electrode that melts without formation of an arc. A cold wire can be connected to a power source for heating of the cold wire; however, the current transferred through the cold wire will not generate an arc.

A welding parameter is a welding equipment parameter that has a direct influence on the welding process. Examples of welding parameters are welding current, arc voltage, welding speed, hot wire feed speed and cold wire feed speed. The term welding parameter does not cover parameters not directly related to the welding equipment, even if said parameters do influence the welding process. Examples of such parameters not included in the term welding parameters are the shape and composition of the object to be welded.

Some welding parameters are related to one or more hot wires. One example of a welding parameter related to a hot wire is a hot wire welding parameter. A hot wire welding parameter (e.g. welding current, arc voltage, hot wire feed speed and welding speed) has a direct influence on the behavior of an arc generated by said hot wire. Another example of a welding parameter related to a hot wire is a welding parameter that exerts influence on and/or is influenced by a hot wire welding parameter. These parameters (e.g. motor speed of a hot wire feeding motor) may have an indirect influence on the behavior of an arc generated by said hot wire.

As mentioned above, a welding parameter may be related to more than one hot wire. For example, when two or more hot wires are connected to the same power source, it may be sufficient to measure one or more welding parameters related to one of said hot wires and assume that the measured parameter values apply to all hot wires.

A parameter related to another parameter is a parameter that, directly or indirectly, is influenced by and/or exerts an influence on said other parameter.

An active welding parameter is a welding parameter that is adjusted during welding in response to changes in welding conditions (e.g. changes in the distance between the end of the hot wire and the work piece). Active welding parameters are sometimes adjusted to maintain one or more non-active welding parameters at an essentially constant level. Active welding parameters may be adjusted manually or automatically in response to detected welding condition variations. Active welding parameters may also be related to and adjusted through adjustment of other active welding parameters. An active welding parameter as defined herein may also be referred to as a variable welding parameter, in contrast to welding parameters that are intended to be maintained at an essentially constant level.

An active welding parameter, e.g. welding speed, can be related to more than one hot wire.

A welding direction is defined as the direction in which a weld is intended to run. An alternative definition of the welding direction is the direction of movement of a welding head or a hot wire.

Welding conditions are external factors that influence the welding process. Examples of external factors are the shape of the work piece surface and material properties of the work piece.

A variable feed speed is a feed speed that can assume more than one value above zero and can be adjusted from one of said values to the other of said values during welding.

Continuous measurement of an active welding parameter means that active parameter values are measured at constant or varying intervals. Normally, welding parameters are measured at intervals of about 1 ms. These measured values are filtered for more accurate results and the (filtered) active welding parameter values, which are used to determine suitable cold wire feed speed target values, are obtained at intervals having a length (in average) of between 0-1000 ms, preferably 50-250 ms and most preferably 75-125 ms.

The method and system according to the invention are intended for use during welding and not during start-up or termination of the welding process. The phase between the start-up phase (creation of the arc and stabilization of welding parameters) and the stop phase (termination of the welding process) will hereinafter be referred to as the welding phase. The welding phase is a phase during which welding action is carried out.

The first object of the invention is achieved with a method for submerged arc welding as defined by independent claim 1.

The method for submerged arc welding comprises the step of guiding a first hot wire electrode towards a work piece and transferring current to said first hot wire for arc generation, e.g. to generate an arc between the first hot wire and the work piece, to create a weld puddle. The method further comprises the step of guiding a cold wire at a variable feed speed towards said weld puddle. The method also comprises the steps of continuously measuring, during a welding phase, at least a first active welding parameter related to at least said first hot wire, which first active welding parameter is continuously adapted to existing welding conditions, and adjusting the cold wire feed speed in dependence on at least first active welding parameter variations, to maintain high welding stability and high weld quality.

The first active welding parameter is continuously measured during the welding phase. Continuous measurement of an active welding parameter means that the active welding parameter is measured at certain intervals, usually about 1 milliseconds (ms) long. The cold wire feed speed may be adjusted in dependence on filtered first active welding parameter values, measured at intervals having an average length of 0-1000 ms, preferable 50-250 ms and most preferably 72-125 ms. The cold wire feed speed may also be adjusted in dependence on unfiltered first active welding parameter values.

The first active welding parameter may be an active hot wire welding parameter, i.e. an active welding parameter that has a direct influence on an arc generated by said hot wire. The first active welding parameter may also be related to one or more active hot wire welding parameters.

The first active welding parameter may be related to more than one hot wire. The first active welding parameter may for example be related to two hot wires connected to a single power source.

Active welding parameter values are used to determine corresponding target values for the cold wire feed speed. A target value for the cold wire feed speed may be determined in dependence on more than one active welding parameter value, which values relate to different active welding parameters. A target value may also be determined in dependence on a corresponding, single active welding parameter value. It is also possible to determine a target value for the cold wire feed speed in dependence on a plurality of active welding parameters values related to a single active welding parameter.

When a welding process becomes unstable, a non-adaptive control of the cold wire feed speed may result in cold wire feed speeds unsuitable for the current welding conditions and increased welding process instability. The cold wire may not melt before it comes into contact with the bottom of the weld puddle if the cold wire feed speed is too high, and a cold wire feed speed that is too low may result in insufficient deposition rates.

This may lead to deposition rate variations, weld defects and inclusions in the weld metal of unmelted cold wire.

These problems are avoided when the cold wire feed speed is made dependent on one or more active welding parameters, which are adjusted to better suit the current welding conditions. The cold wire feed speed is adjusted during welding to the current welding conditions and the active hot wire welding parameters. This will improve the quality of the weld and the welding process stability.

Adjustment of the cold wire feed speed is preferably but not necessarily carried out automatically in response to active welding parameter variations, to ensure a quick and precise response to a change in welding conditions.

It is known to adjust at least one active welding parameter to maintain one or more welding parameters at a set level also when disturbances, such as stick out variations caused by work piece surface irregularities, variations in the welding process or joint configurations, are encountered.

An active welding parameter may be related to and adjusted through adjustment of another active welding parameter, and the cold wire feed speed can be adjusted in dependence on any of these active welding parameters. For example, adjustment of the feed speed of a hot wire may change the arc voltage of that hot wire. The cold wire feed speed can be adjusted in dependence on any one or both of said parameters.

Maintaining a welding parameter at a set or constant level means that the welding parameter is restored, through adjustment of at least one active welding parameter, to said set level if it should diverge from said set level, e.g. as a consequence of an encountered disturbance. That is, the active welding parameter is adjusted to restore said welding parameter to a specific level when the welding parameter assumes a value that differs from said level.

A constant wire feed (CW) process is a welding process during which the hot wire feed speed is set at a specific rate and the welding current is automatically adjusted to maintain an arc voltage level.

The method according to the invention may comprise the step of adjusting the cold wire feed speed in dependence on welding current variations, when the welding current is an active hot wire welding parameter. This embodiment makes the method compatible with CW welding processes.

A constant amperage (CA) process is a process wherein an arc voltage level is maintained essentially constant and the welding current is controlled through adjustment of the hot wire feed speed. A hot wire feed speed increase will result in a welding current increase, since the welding current level is related to the distance between the electrode end and the work piece. Similarly, a hot wire feed speed reduction will result in a welding current reduction. Consequently, the amperage level can be maintained essentially constant through adjustment of the hot wire feed speed.

The method according to the invention may comprise the step of adjusting the cold wire feed speed in dependence on hot wire feed speed variations, when the hot wire feed speed is an active hot wire welding parameter. This embodiment makes the method compatible with CA welding processes.

In constant current (CC) processes, the welding current remains essentially constant whereas the arc voltage is dependent on the rate at which the hot wire is fed towards the work piece.

The method according to the invention advantageously involves the step of adjusting the cold wire feed speed in dependence on changes in hot wire feed speed and/or arc voltage when the hot wire feed speed and/or the arc voltage are active hot wire welding parameters. This embodiment makes the method compatible with CC welding processes.

It is possible to link the cold wire feed speed to other active welding parameters not mentioned in the specification, on the condition that these parameters are adaptable to changing welding conditions and are related to at least one hot wire electrode.

The cold wire feed speed can also be dependent on the welding power. The welding power can be defined as:

$$P = U \times I \qquad (2),$$

where P (kJ) is welding power, U (V) is arc voltage and I (A) is welding current. Less energy in the welding process means that there is less excessive energy to melt the cold wire. Advantageously, the cold wire feed speed is reduced when there is less energy in the welding process. More energy means that there is more excessive energy to melt the cold wire, and so the cold wire feed speed is advantageously increased in response to a detected increase in welding power.

The welding power may constitute an active welding parameter. It is also possible to define the welding power as a parameter related to one or more active welding parameters, e.g. arc voltage and/or welding current.

In some embodiments, the cold wire feed speed is dependent on a plurality of active welding parameters related to the same hot wire. This is, for example, the case when the welding power is dependent on an arc voltage and a welding current that change over time (equation 2). It is also possible to maintain one of the arc voltage and the welding current essentially constant over time.

The cold wire feed speed can also be dependent on the heat input. The heat input can be defined as:

$$Q = k \frac{U \times I}{v} \times 10^{-3}, \qquad (3)$$

where Q (kJ/mm) is the heat input, k (dimensionless) is the thermal efficiency, U (V) is voltage, I (A) is current and v (mm/min) is the welding speed. Here, the welding speed may also be an active welding parameter. The welding speed can be defined as the speed at which a welding head or one or more hot wires are moved across a work piece surface.

As above, the heat input can be defined as a variable parameter, related to one or more active welding parameters, to be used to determine cold wire feed speed values. The heat input can also be defined as an active welding parameter.

Sometimes it is desirable to maintain the welding energy at an essentially constant level throughout the welding process and vary the amount of electrode material that is deposited on the work piece. In this case, an increase in the hot wire feed speed will result in an increase in the cold wire feed speed, and correspondingly, a reduction of the hot wire feed speed will result in a reduced cold wire feed speed.

There may be alternative definitions of the welding power or heat input and any definition is applicable in the present invention.

In one embodiment, the method advantageously comprises and repeats the steps of determining a target value for the cold wire feed speed based on at least a first active parameter value and adjusting said cold wire feed speed to said target value.

Advantageously, the arc has stabilized before the cold wire feed speed reaches a target value higher than its previously measured target value, to ensure that the cold wire does not hit the bottom of the weld puddle. For example, the arc may become unstable following an increase of the hot wire feed speed.

One way of ensuring that the cold wire feed speed is not increased too much, too soon, is to increase the cold wire feed speed in steps until the cold wire has reached its target value. The cold wire feed speed is advantageously increased in steps of up to 100 cm/min, advantageously 1-10 cm/min and even more advantageously 4-6 cm/min. The cold wire feed speed is not increased as quickly as the corresponding active welding parameter(s), thus providing sufficient time for the arc to stabilize and melt the end of the cold wire before the cold wire hits the bottom of the weld puddle.

The time interval between active welding parameter measurements is advantageously as short as possible. A suitable time interval is about 1 ms. The measured values may be filtered to achieve a more accurate adjustment of the cold wire feed speed.

Active welding parameter values (filtered or unfiltered) used to determine target values for the cold wire feed speed are advantageously measured at intervals having a mean length of 10-1000 ms, preferably 50-500 ms and most preferably 75-125 ms. Consequently, the cold wire feed speed may be adjusted in steps having a mean length of 10-1000 ms, advantageously 50-500 ms and most preferably 75-125 ms. It is of course possible to increase the time interval between the measurements of the active welding parameter to up to 1000 ms.

The initiation of the increase of the cold wire feed speed can be delayed with respect to the occurrence of the active welding parameter value(s) on basis of which the target value for the cold wire feed speed has been determined. The increase may then be carried out continuously or in one or more steps, as described above. The length of said time delay can, for example, be dependent on the size of said cold wire feed speed increase, i.e. the difference between the target value and the previous target value, or on the size of said increase in said active hot wire welding parameter.

The length of said delay may be 0-10 seconds and most preferably 0.5-3 seconds per 1000 mm/min increase in hot wire feed speed or per 100A increase. The delay in time can also be set constant at 0-10 seconds, most preferably 0.5-3 seconds, regardless of the size of the increase. The time delay can be defined as the time period between the occurrence of an active welding parameter value and the initiation of a cold wire feed speed increase caused by said active welding parameter value.

The cold wire feed speed is usually below 120% of the hot wire feed speed, and advantageously between 60-80% of the hot wire feed speed. A hot wire feed speed can assume any value from 1000 mm/min to 10000 mm/min.

Should the hot wire parameter change again before the cold wire feed speed has reached its target value, then another target value for the cold wire feed speed is determined and the cold wire feed speed is adjusted accordingly.

A reduction of the cold wire feed speed is advantageously carried out instantaneously with respect to the detection of the active welding parameter value(s) causing said reduction, and in a single step. Examples of hot wire parameter variations causing a reduction of the cold wire feed speed are: reduction of the hot wire feed speed, welding current, arc voltage or welding energy. An instantaneous reduction of the cold wire feed speed ensures that the cold wire will melt before it hits the bottom of the weld puddle even if the melting rate is reduced. The time delay should be as short as possible. Advantageously, the target value for the cold wire feed speed is reached within 200 ms, preferably within 100 ms, more preferably within 10 ms and most preferably within 1 ms with respect to the occurrence of the corresponding active welding parameter value causing said reduction.

It is possible to reduce the cold wire feed speed to a level below the target value, to ensure that the arc is given sufficient time to stabilize and that the cold wire does not hit the bottom of the weld puddle, and then increase the cold wire feed speed (as described above with reference to an increase of the cold wire feed speed) until the target value is reached. The cold wire feed speed may even be brought to a halt before being increased to said target value.

The cold wire feed speed can be increased or reduced in one or more steps. It is also possible to adjust the cold wire feed speed continuously according to a curve having a constant or changing gradient. The gradient may increase when the cold wire feed speed approaches its target value, remain constant throughout said adjustment of the cold wire feed speed or decrease when the cold wire feed speed reaches its target value.

The cold wire feed speed may be adjusted in steps and the steps may have varying length (ms) and/or height (cm/min). For example, the steps may be shorter and higher when the cold wire approaches its target value, or, alternatively, be shorter and higher when the cold wire feed speed adjustment is initiated. Of course, the adjustments of the cold wire feed speed may also be carried out in steps having a constant length (ms) and/or a constant height (cm/min).

An active welding parameter change detected during adjustment of the cold wire feed speed will result in a new target value being set for the cold wire feed speed. The new target value is applied immediately, i.e. the control unit immediately instructs the cold wire feeding means to adjust the cold wire feed speed to the new target value in accordance with any method described herein (which may or may not include a time delay).

A cold wire feed speed increase is preferably delayed with respect to the occurrence of an active welding parameter value causing said increase, and a reduction of the cold wire feed speed is preferably instantaneous or delayed with as short a time period as possible with respect to an active welding parameter value causing said reduction.

The method may comprise the steps of guiding more than one hot wire towards the work piece and controlling the cold wire feed speed in dependence on a plurality of active welding parameters related to one or more of said hot wires. This ensures accurate control of the cold wire feed speed.

The cold wire feed speed may be controlled in dependence on all hot wires in an arc welding system or in dependence on a subset of hot wires, said subset comprising one or more hot wires.

The cold wire feed speed may be controlled in dependence on active welding parameters of the same type or active welding parameters of more than one type.

The cold wire feed speed may be controlled in dependence on a mean value for a plurality of active welding parameters of the same type or a weighted mean value for a plurality of active welding parameters of the same type. Both solutions ensure improved control of the cold wire feed speed; the latter solution when it is desirable to strengthen the cold wire feed speeds dependence on a particular subset of active welding parameters, e.g. active welding parameters related to one or more hot wires located in the vicinity of said cold wire or one or more hot wires performing a specific task.

It is possible to alternate between active welding parameters when determining target values for the cold wire feed speed.

It may be advantageous to alternate between hot wires when determining target values for the cold wire feed speed. This may, for example, ensure a more accurate adjustment of the cold wire feed speed when a plurality of hot wires alternately produce an arc between themselves and the work piece, in which case the cold wire feed speed may always be controlled in dependence on a hot wire currently producing an arc between itself and the work piece.

It is also advantageous to alternate between hot wires when one or more of the hot wires switches from DC to AC during welding. For example, a tandem welding process may involve a leading welding head provided with direct current (DC) (to control degree of penetration) and a trailing welding head provided with alternating current (AC) (to control weld bead appearance, contour and fill), wherein the leading welding head switches to AC during a second pass. In this case, it may be advantageous to link the cold wire feed speed to the trailing electrode during a first pass and to the leading and/or the trailing electrode during a second pass, considering that an AC electrode can be used to control weld bead appearance and fill. Alternatively, it may be advantageous to have the cold wire feed speed dependent on the leading electrode during the first pass, considering that a DC electrode generates a more stable arc.

Obviously, the method may include the step of measuring active hot wire welding parameters of different types. It is also possible to use one or more active welding parameters related to the same hot wire(s) when determining the target value for the cold wire feed speed.

The method advantageously comprises the step of guiding at least a second consumable hot wire electrode towards the work piece and transferring current to said second hot wire for arc generation, e.g. to generate an arc between the second hot wire and the work piece. The first and the second hot wires are arranged to create a common weld puddle. Of course, it is possible to use more than two hot wires for creation of a single weld puddle. The method may further include the steps of continuously measuring, during a welding phase, at least a second active welding parameter related to at least said second hot wire, which second active welding parameter is continuously adapted to existing welding conditions, and adjusting the cold wire feed speed in dependence on variations in at least said first and second active welding parameters, to maintain a high welding stability and high weld quality.

The second active welding parameter may be an active hot wire welding parameter or an active welding parameter related to an active hot wire welding parameter.

Using more than one hot wire increases the productivity of the SAW process and using active welding parameters of both hot wires to control the cold wire feed speed ensures improved control over the cold wire feed speed adjustment process.

A plurality of hot wires can be mounted in various formations. When the hot wires are arranged at a distance from one another along the welding direction, the front hot wire is referred to as the leading hot wire and the one or more hot wires following the leading hot wire are referred to as trailing hot wires.

Advantageously, the cold wire is located in parallel with and in the overlapping region between hot wires. This will ensure that the variation of the magnitude of the overlapping region will be reduced and the variation of the deposition rate of the cold wire will likewise be reduced.

Optionally, the hot wires lie in a first plane and the cold wire lies in a second plane orthogonal to the first plane. This enables a symmetric position of the cold wire in relation to the first and second hot wires. A symmetric positioning of the cold wire with respect to the hot wires allows for more stable arc plasma conditions at the location of the cold wire. Thus a more stable deposition rate of the cold wire can be achieved.

The active welding parameter can be related to the leading and/or one or more of the trailing hot wires.

Each hot wire can be powered via a separate power source. This may be advantageous in many applications since the control of power supply to each hot wire is facilitated. The magnet interference between hot wires may also be reduced by supplying phase shifted welding currents to the hot wires. This may be accomplished by conventional Scott coupled power sources or by use of complex power sources, such as high frequency converters, for instance.

Welding apparatuses using two or more separate power sources tend to be expensive and bulky. Hence, for some applications, such as welding in constrained spaces, it may be desirable to use a single power source for feeding a welding current to the hot wires.

An advantage of using more than one hot wire is that the deposition rate may be increased for a given amount of power input. The use of more than one hot wire allows for a reduction in electrode diameter, which in turn increases the current density for each hot wire. The increased current density allows for increased pre-heating of the electrode, hence a higher deposition rate can be maintained at less heat transfer to the weld puddle.

As mentioned above, leading and trailing hot wires may serve different purposes. The leading hot wire is advantageously connected to a DC power source, which ensures high power and high penetration, whereas trailing hot wires usually are connected to AC power sources and provides more deposited material at a low current. The leading hot wire is usually more stable. Similarly, hot wires received in a leading welding head may be connected to single DC power source whereas hot wires received in a trailing welding head may be connected to a single AC power source.

The method according to the invention may comprise the step of measuring active welding parameters related to said leading hot wire and at least one trailing hot wire.

It is possible to use more than one cold wire in the welding process. The feed speed of each cold wire can be independently determined. This is advantageous when the cold wires are exposed to different amounts of heat and subject to different welding conditions. It is also possible to apply the same welding speed, determined through measurement of one or more active welding parameters, on a plurality of cold wires. This makes it possible to reduce the complexity of the welding apparatus (for example, it becomes possible to feed more than one cold wire by means of a single cold wire feeding means).

The second object of the invention is achieved with a submerged arc welding system for carrying out the method according to the invention. The submerged arc welding system comprises hot wire feeding means for feeding a first hot wire towards a work piece and first contact means for transferring current to said first hot wire for arc generation, e.g. to generate an arc between the first hot wire and the work piece, to generate a weld puddle. The system further comprises second wire feeding means for feeding a cold wire at a variable cold wire feed speed towards said weld puddle and a control unit for controlling the second wire feeding means. Additionally, the system comprises measuring means adapted to continuously measure, during a welding phase, at least a first active welding parameter related to at least said first hot wire, which first active welding parameter is continuously adapted to existing welding conditions, and provide information to said control unit regarding first active welding parameter values. Said control unit is adapted to determine targets value for the cold wire feed speed based on said information, each target value determined in dependence on at least a first active welding parameter value, and to control said second wire feeding means to adjust said cold wire feed speed to said target values.

The system according to the invention ensures that the cold wire feed speed is adapted to one or more active welding parameters of one or more hot wires and does not become too high or too low during the welding process. This will ensure a high quality weld and a stable welding process.

A contact means can be any suitable means for transferring a welding current to a hot wire. The contact means is suitably adapted to guide the hot wire towards the work piece. An example of a suitable contact means is a contact tube adapted to receive a hot wire, which contact tube is connected to a power source.

The hot wire feeding means and the cold wire feeding means are arranged so that they can provide different wire feed speeds. However, they may form part of a single wire feeding unit. They may also be arranged separately from one another.

Measuring means according to the invention are adapted to continuously measure active welding parameter values and provide information regarding said values to said control unit. An active welding parameter related to a hot wire may be an active hot wire welding parameter or an active welding parameter related to an active hot wire welding parameter. The term active hot wire welding parameter covers, for example, hot wire feed speed, welding current and arc voltage.

Information relating to a specific active welding parameter value is advantageously sent from the measuring means to the control unit as soon as the value is measured, to prevent unnecessary delays in the adjustment of the cold wire feed speed.

Said measuring means may comprise a sensor adapted to measure the rotational speed of a motor shaft in a motor arranged to feed a hot wire towards a work piece. Said measuring means may also comprise a sensor for measuring the diameter of a hot wire coil rotated by means of said motor shaft for feeding said hot wire towards said work piece. It is also possible to calculate or use an estimated value of the diameter of the hot wire coil. This information is transferred to said control unit, which calculates the hot wire feed speed. These solutions are simple and less expensive.

It is also possible to use one or more sensors that measure the feed speed of the hot wire. This solution provides more accurate results.

Said measuring means may also comprise one or more shunts in the power source, for measuring the welding current. The shunt is placed in series with a load so that all of the current to be measured will flow through it. The voltage drop across the shunt is proportional to the current flowing through it and the shunts resistance is known, wherefore measuring the voltage allows for determination of the welding current.

Said measuring means may also comprise one or more means for measuring arc voltage. Arc voltage is advantageously measured between the work piece and the closest end of the hot wire to avoid voltage drop.

A control unit according to the invention is any means capable of determining a target value for a cold wire feed speed based on information relating to at least one active welding parameter. The control unit is arranged to receive information from one or more measuring means and based on said information register, determine or calculate an active welding parameter value. Obviously, said control unit and said measuring means may form part of a single control means. A control means may for example comprise a control unit and at least one sensor for registering a hot wire feed speed. A control means may also comprise a circuit arrangement for determining arc voltage. Said control unit and said measuring means may also be separate from one another.

An active welding parameter does not have to be measured at a corresponding hot wire. For example, a weld current can be measured at a power source connected to the hot wire.

The control unit and the cold wire feeding means can form part of a single unit or be separate entities.

The control unit is arranged to determine target values for the cold wire feed speed and control the cold wire feeding means to implement said target values. The control unit may also be adapted to determine a suitable time delay for the initiation of an adjustment of the cold wire feed speed. The control unit may also be adapted to determine suitable lengths and heights for cold wire feed speed adjustment steps and gradients for cold wire feed speed adjustment curves. Information regarding these adjustments can be provided to the cold wire feed means in the form of signals.

A plurality of parameters can be used as active welding parameters. Examples of suitable active welding parameters are hot wire amperage, arc voltage, welding current and welding energy. This makes the system and method compatible with a plurality of different welding processes (CA, CW, CC etc.). Alternative active welding parameters are hot wire heat input and hot wire welding power. Heat input and welding power can also be calculated based on information relating to one or more active welding parameters.

The system is arranged to ensure that the cold wire feed speed does not rise too quickly following the occurrence of an active welding parameter value indicating that the cold wire feed speed should be increased. That is, the system ensures that the cold wire feed speed does not reach its target value until the arc is stabilized. The initiation of the cold wire feed speed increase may be delayed or the increase may be performed at an average rate slower than the average change rate of the active parameter value. It is of course possible to combine these two alternatives.

The cold wire feed speed may be increased in steps of up to 100 cm/min, preferably between 1-10 cm/min and most preferably between 4-6 cm/min, until it reaches its target value. It is possible to use smaller steps than 1 cm/min, for example when the difference between the target value and the present cold wire feed speed value is less than 1 cm/min.

In some embodiments, the cold wire feed speed is adjusted only if the difference between the target value and the present cold wire feed speed exceeds a predetermined value.

The steps are advantageously executed with intervals of between 10-1000 ms, preferably between 50-500 ms and most preferably 75-125 ms until the cold wire feed speed reaches its target value.

An increase of the cold wire feed speed to a target value does not have to be executed in steps of the same height (cm/min) or at constant intervals (ms).

A reduction of the cold wire feed speed is advantageously carried out instantaneously or at least within 200 ms, advantageously within 100 ms, more advantageously within 10 ms and most advantageously within 1 ms with respect to the occurrence of the active welding parameter value(s) causing said reduction. A quick reduction of the cold wire feed speed ensures that the cold wire will not hit the bottom of the weld puddle before the arc has stabilized.

The cold wire feed speed may be reduced to a level below the target value and then increased to the target value, to ensure that the arc is stable once the cold wire feed speed reaches its target value.

An increase or reduction of the cold wire feed speed may be executed in one or more steps. Alternatively, the adjustment of the cold wire feed speed may be continuous. It is also possible to use any combination of these two alternatives.

A system according to the invention may comprise at least one welding head adapted to receive at least one cold wire and at least one hot wire. Advantageously, the welding head is adapted to receive more than two wires, which makes the system more compact.

Alternatively, the system comprises at least one welding head adapted to receive one or more hot wires and means for feeding one or more cold wires towards the weld puddle. The system may comprise a single welding head arranged to receive a plurality of cold wires or a plurality of welding heads arranged to receive one or more cold wires. The hot and cold wires may be received in separate welding heads or wire feeding units.

The submerged arc welding system can be arranged to feed the hot wires and cold wires towards the work piece at different locations relative one another and in different directions.

The system according to the invention advantageously comprises hot wire feeding means arranged to feed a second consumable hot wire electrode towards the work piece and second contact means arranged to transfer a current to said second hot wire for arc generation, e.g. to generate an arc between the second hot wire and the work piece, wherein said first and second first and second contact means are arranged to transfer current for generation of a common weld puddle. The system may also comprise measuring means arranged to continuously measure, during a welding phase, at least a second active welding parameter related to at least said second hot wire, which second active welding parameter is continuously adapted to existing welding conditions. Said measuring means provides information regarding measured second active welding parameter values to the control unit as soon as they are measured. The control unit is arranged to continuously determine target values for the cold wire feed speed based on information relating to said first and second active welding parameters and to control said second wire feeding means to adjust said cold wire feed speed to said target vales.

The hot wire feeding means for feeding the first hot wire can be separate from the hot wire feeding means for feeding the second hot wire. Alternatively, the hot wire feeding means for feeding the first and second hot wires may be one and the same.

The control unit may receive a plurality of active welding parameter values and weigh the received values or calculate a mean value of some or all of said values, using any suitable approach, before determining the target value for the cold wire feed speed.

Said first and second contact means may be connected to the same power source or to different power sources. In one embodiment, one of the power sources is an AC power source whereas the other power source is a DC power source.

The system according to the invention may of course be arranged to receive more than one cold wire. Additional cold wires may be separately controlled. Alternatively, the same target value for the cold wire feed speed can be applied to all or some of the cold wires. This may be suitable when one or more of the cold wires have the same composition and dimensions. The same active welding parameter values can also be used to determine individual cold wire feed speeds for a plurality of cold wires. The individual feed speed of a cold wire may be determined in dependence on, for example, that cold wires composition and dimensions.

The control unit may employ any suitable function to determine a target value for the cold wire feed speed, wherein at least one variable is an active welding parameter. It is also possible to use predetermined tables or similar means wherein active welding parameter values corresponds to target values for the cold wire feed speed. For example, the control unit may be programmed to apply a cold wire feed speed which is 60-80% of the hot wire feed speed.

The measuring means for measuring an active welding parameter related to said second hot wire may be the same or separate from the measuring means for measuring an active welding parameter related to said first hot wire. A measuring means according to the invention may be arranged to measure one or more active welding parameters related to one or more hot wires.

A cold wire is advantageously introduced into an overlapping arc zone of more than one hot wire, to increase the deposition rate without having to increase the welding current.

It may be preferable to arrange the cold wire in between two hot wires. The hot wires may preferably be mounted at an axial distance being less than a cone diameter of the arc (normally it is assumed that the arc is present within a cone from the tip of the hot wire to the work piece and a normal opening angle is around 30°, measured at the surface of the weld puddle). With this arrangement, the cold wire will be introduced in the outer parts of the arc area defined by the cone of both hot wires which has shown to be beneficial for the weld result.

Submerged arc welding can be operated as a fully-mechanised semi-automatic or automatic process.

The scope of protection covers embodiments wherein a measuring means measures active welding parameter values, the control means uses said measured values to determine other active welding parameter values (e.g. motor speed) corresponding to said measured values, and the control means uses said determined active welding parameter values to adjust an active welding parameter (e.g. motor speed) and to determine corresponding cold wire feed speed values.

BRIEF DESCRIPTION OF THE DRAWINGS

The present invention together with the above-mentioned and other objects and advantages may best be understood from the following detailed description of exemplary embodiments of the invention. The detailed description contains references to drawings, wherein:

FIG. 1b shows an alternative embodiment of the welding apparatus in FIG. 1a;

DETAILED DESCRIPTION OF PREFERRED EMBODIMENTS OF THE INVENTION

Figure 1A:
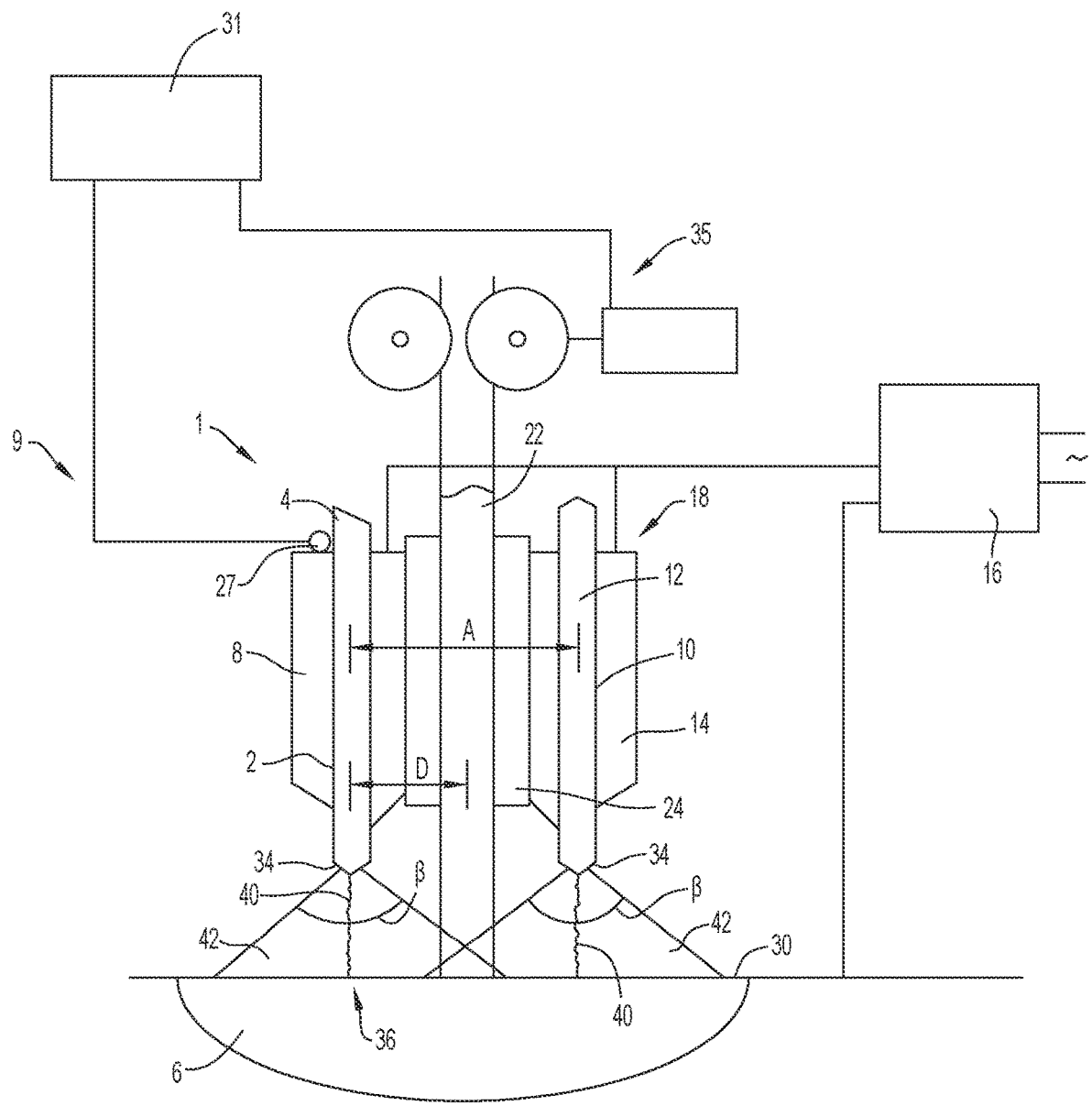
FIG. 1a shows a twin wire welding apparatus according to the invention connected to a single power source.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1a shows portions of a submerged arc welding system 9 comprising a twin welding apparatus 1. The twin welding apparatus includes a first contact tube 2 for guiding a first hot wire 4 towards a weld puddle 6. The first contact tube 2 is arranged in a contact tip 8 in a conventional manner. Welding current is transferred through said contact tube 2 to the first hot wire 4. A second contact tube 10 is arranged in the twin wire welding apparatus 1 for guiding a second hot wire 12 towards the weld puddle 6. The second contact tube 10 is arranged in a contact tip 14 in a conventional manner. The first and second contact tips 8, 14 may be arranged in a single body, which may be aggregated by parts, or in separate bodies. At the second contact tube 10, welding current is transferred to the second hot wire 12.

A single power source 16 is connected to a contact device 18 including the contact tips 8, 14 and housing the first and second contact tubes 2, 10. The single power source 16 provides the same potential to the first and second hot wires 4, 12. The power source may be of any conventional type operable for twin wire welding, such as a welding converter, a welding transformer, a rectifier, a thyristor controlled rectifier or an inverter.

The twin wire welding apparatus 1 further includes a feeding arrangement for feeding a cold wire 22 into the weld puddle 6. The feeding arrangement includes a tube 24, which is electrically insulated from the first and second contact tips 8, 14. The cold wire 22 is fed via the tube 24. When welding, arcs 40 will be present at the first and second hot wires 4, 12, but not at the cold wire 22. The cold wire 22 is melted by introduction of the cold wire into areas of the arcs 40. Suitably, the cold wire 22 is not connected to any electrical power source and will therefore generally assume a ground potential. However, it may be possible to connect the cold wire 22 to a power source for pre-heating the cold wire. However, the cold wire 22 will not be connected to a power source for the purpose of arc generation. The tube 24 may be a metallic tube that is isolated from the first and second contact tips 8, 14, or a ceramic tube.

In submerged arc welding an arc 40 is present between the tip of an electrode and the work piece. The arc and the melted material are protected beneath a layer of pulverized flux. The flux melts in part during the process, thus creating a protecting layer of slag on the weld puddle.

An arc 40 is shown in FIG. 1a. The contact of the arc 40 at the working piece will be moving in a random manner. However, normally it is assumed that the arc 40 is present within a cone 42 from a tip 34 of the hot wire to the weld puddle 6. The opening angle β of the cone 42 may vary from welding case to welding case. However, a normal opening angle β is around 30°. For this reason it is preferable to locate the cold wire 22 such that it enters the arc area in an essentially orthogonal direction thereto at an axial distance D being less than L*cotan β/2) from the consumable electrode measured at the tip 34 of the consumable electrode. Here L is the arc length, which is the distance from the electrode tip 34 to the closes point 36 of the weld puddle.

A flux hopper 11 (see FIG. 2) is arranged to feed granular flux to a contact device 160 that holds the hot wires 4, 12 and the cold wire 22. The granular flux is fed to the contact device 160 via a nozzle (not shown).

It may be preferable to arrange the cold wire 22 in between two hot wires 4, 12. The hot wires 4, 12 are preferably mounted at an axial distance A being less than a cone diameter measured at the surface 30 of the weld puddle 6. With this arrangement, the cold wire 22 will be introduced into the outer parts of the arc area defined by the cones 42 of both hot wires 4, 12, which is beneficial for the weld result.

The twin wire welding apparatus 1 further comprises a sensor 27 for measuring the feed speed of the first hot wire 4.

Of course, it is possible to employ more than one sensor and to measure the feed speed of both hot wires. However, in twin welding, when two hot wires are connected to the same power source, the hot wires are often considered as a single hot wire and only one sensor is required.

In alternative embodiments, the sensor 27 may be replaced by any suitable measuring means adapted to measure other active welding parameters, such as, for example, welding current or arc voltage.

The twin wire welding apparatus 1 in FIG. 1 is adapted to carry out a CA welding process. Disturbances, such as varying distance between the hot wire tips 34 and the work piece, may have a negative effect on the welding process. Consequently, the twin wire welding apparatus 1 is adapted to adjust the feed speed of the hot wires 4, 10 to maintain the amperage at an essentially constant level, to compensate for disturbances.

The sensor 27 is arranged to continuously with intervals of about 1 millisecond measure the hot wire 4 feed speed and transfer measured hot wire feed speed values to a control unit 31. The control unit 31 filters the received values; the values to be subsequently used to control the cold wire 22 feed speed are measured at intervals having a mean length of between 75-125 milliseconds. For each filtered value, the control unit 31 determines a corresponding target value for the cold wire 22 feed speed.

The control unit 31 also determines whether the target value is higher or lower than the current cold wire 22 feed speed. A reduction of the cold wire 22 feed speed is advantageously carried out as quickly as possible, whereas an increase of the cold wire feed speed should be delayed with a time period dependent on the size of said increase, to ensure that the arcs 40 are stabile before the cold wire 22 feed speed reaches its target value.

A signal is sent from the control unit 31 to a cold wire feeding means 35 (described in detail below) disposed for feeding the cold wire 22 towards the work piece. The cold wire feeding means 35 increases or reduces the cold wire 22 feed speed in accordance with instructions from the control unit 31.

Figure 1B:
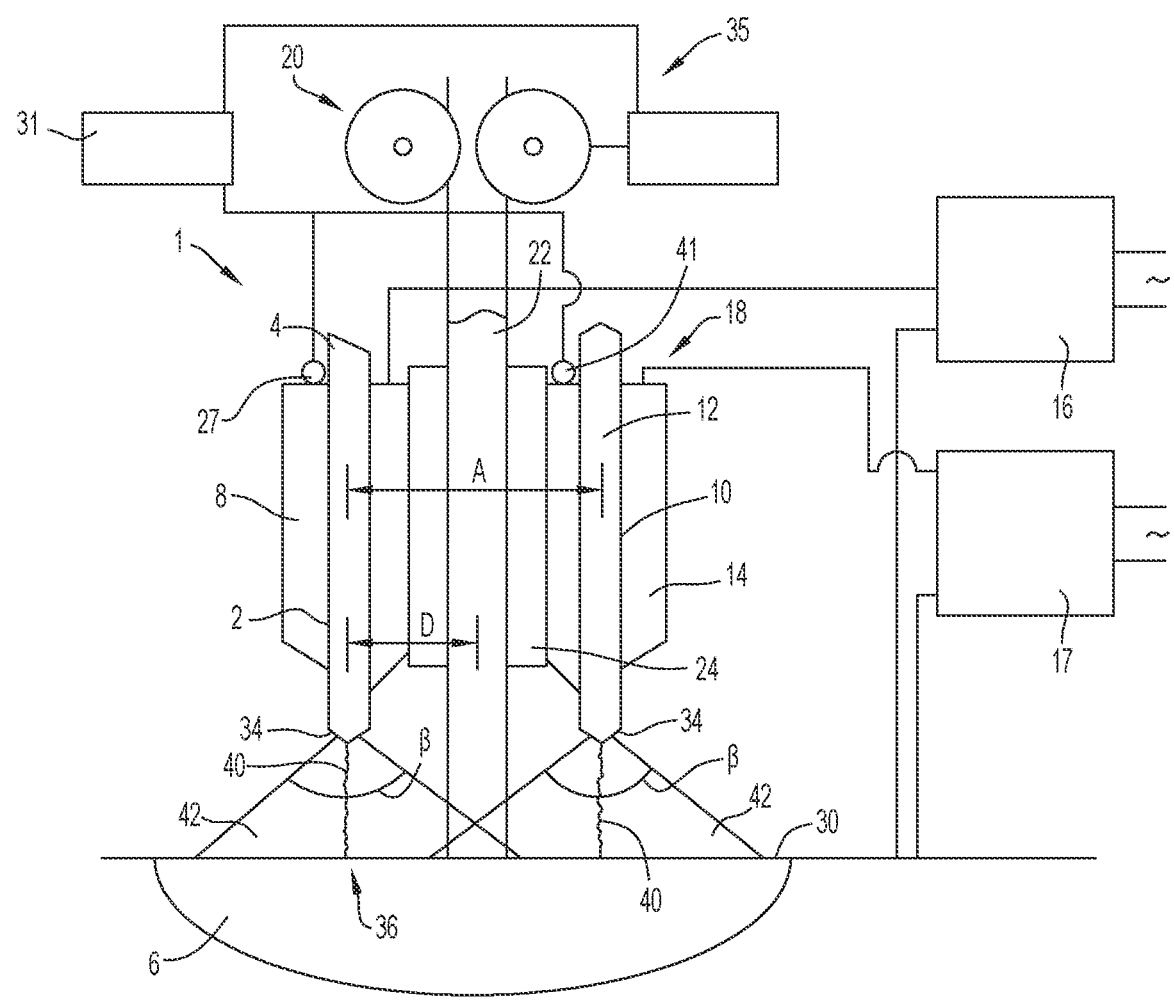

FIG. 1b shows an alternative embodiment of the welding apparatus 1 according to FIG. 1a, wherein the hot wires 4, 12 are connected to separate power sources 16, 17 and may be fed at different feed speeds.

The welding apparatus in FIG. 1b can be programmed to run twice around a steel tube (not shown) to weld said steel tube to another steel tube. The first hot wire 4 is the leading hot wire and the second hot wire 12 the trailing hot wire, as seen in a welding direction. The first hot wire 4 is connected to a first power source 16 and the second hot wire 12 to a second power source 17.

A second sensor 41 is arranged to measure the feed speed of the second hot wire 12. The second sensor 41 is connected to the control unit 31, which is arranged to receive information from both sensors 27, 41.

During the first lap, the first power source 16 transfers DC to the first hot wire 4, which ensures adequate penetration, whereas the second power source 17 provides the second hot wire 12 with AC. Thus, the second hot wire 12 has a great influence on weld bead appearance, contour and fill. The first power source 16 switches from DC to AC at the beginning of the second lap, so that both hot wires 4, 12 will have a great influence on weld bead appearance, contour and fill during the second lap.

The sensors 27, 41 are arranged to continually measure the feed speeds of the hot wires 4, 12 and provide information relating to the hot wire feed speeds to the control unit 31.

The control unit 31 is programmed to use hot wire 12 feed speed values received from the second sensor 41 to control the cold wire 22 feed speed during the first lap, and to use a mean value of the hot wire 4, 12 feed speed values received from the first and second sensors 27, 41 during the second lap. This ensures that the cold wire 22 feed speed is linked to the feed speed of the hot wire(s) 4, 12 that has the greatest influence on the filling of the weld puddle 6.

Figure 2:
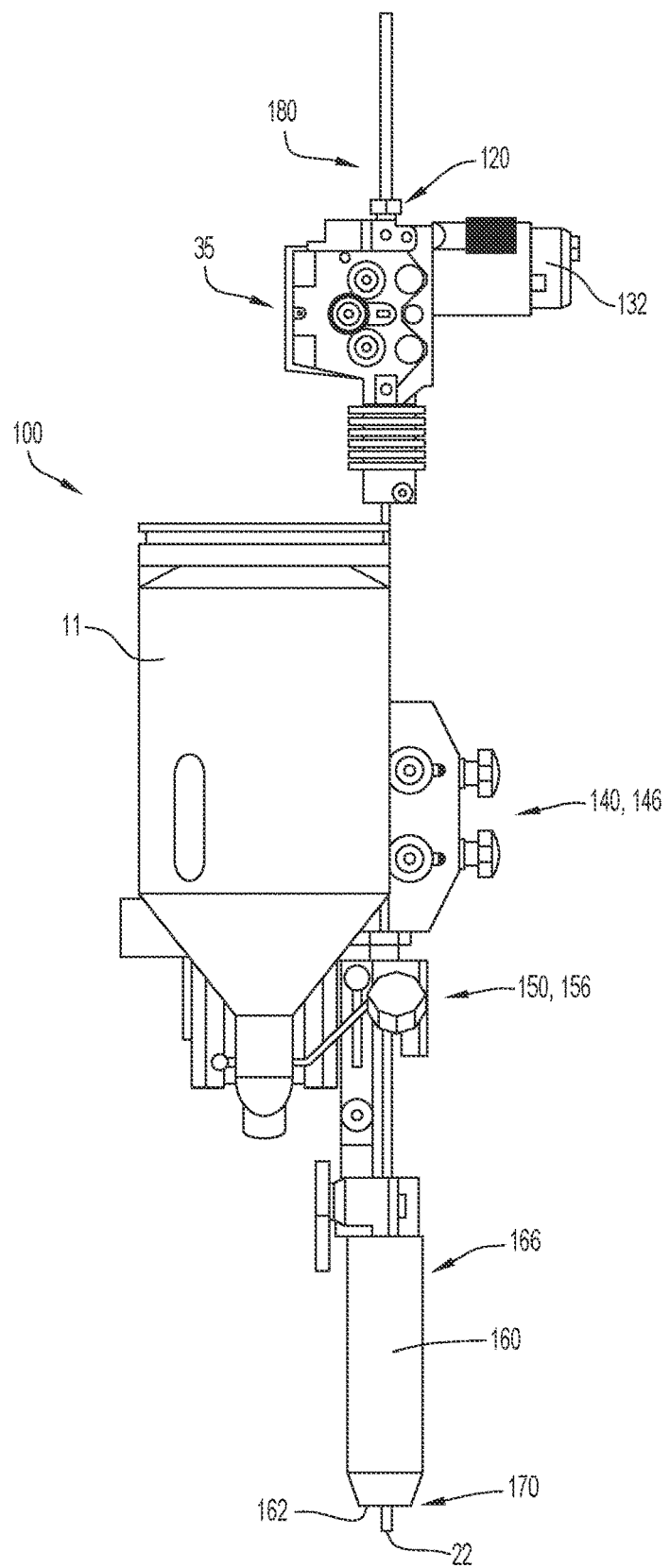
FIG. 2 shows an arc-welding welding head according to the invention.
Figure 3:
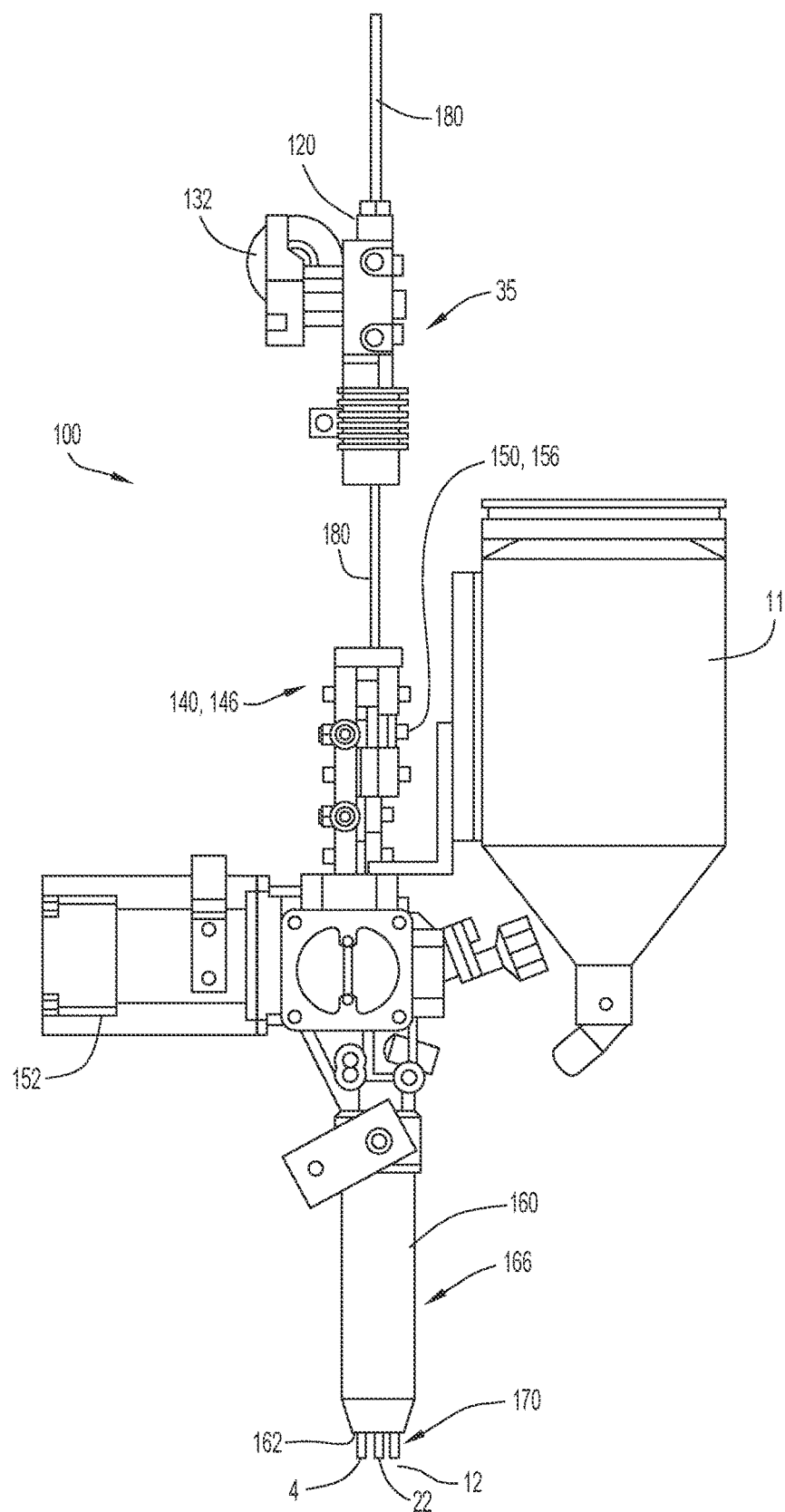
FIG. 3 shows the welding head of FIG. 2 turned counter-clockwise by 90°.
Figure 4:
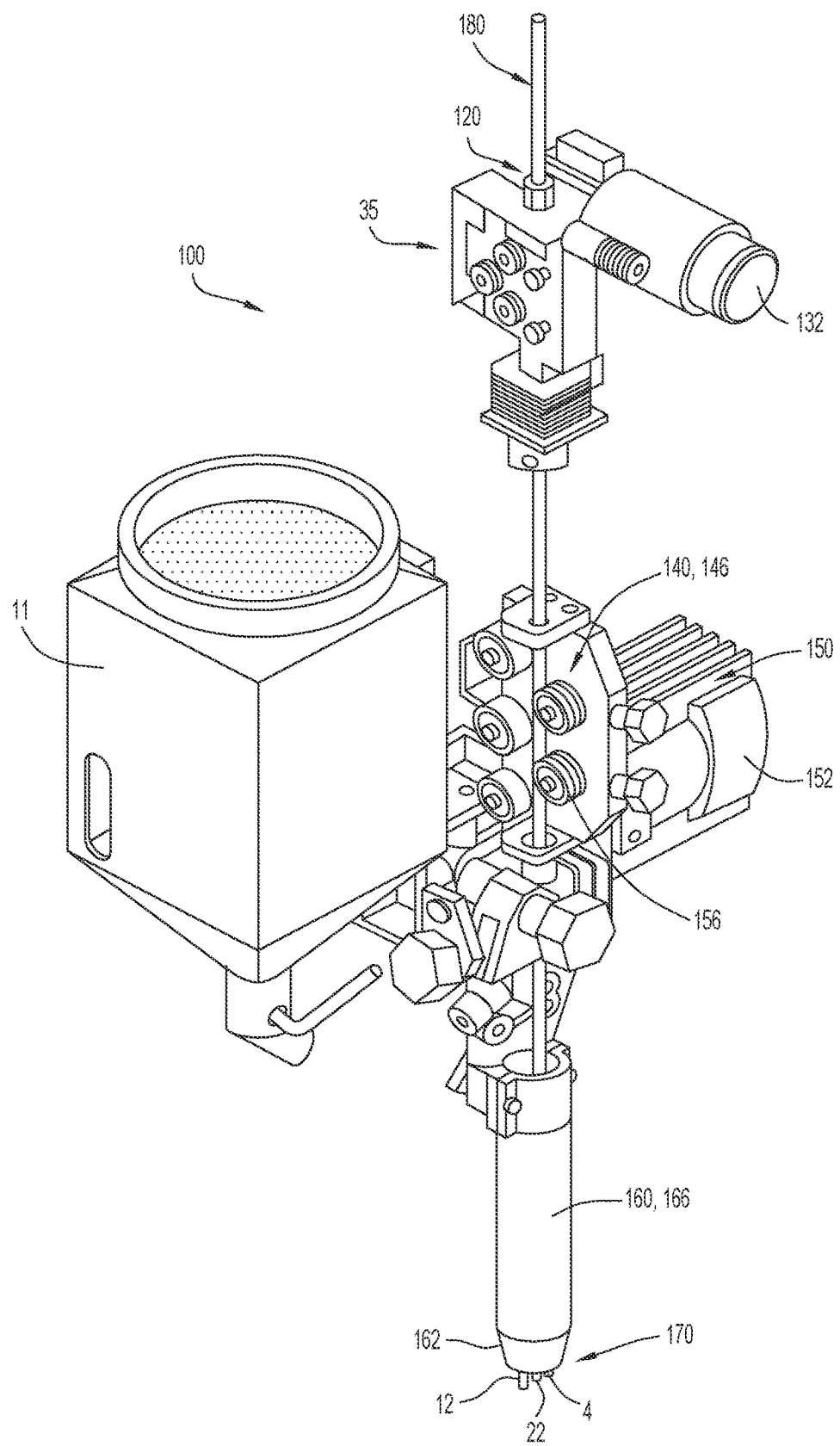

FIGS. 2 to 4 depict different views of an electric arc-welding welding head 100 for the twin welding apparatus 1 in the system 9 in FIG. 1a.

At one end, the welding head 100 comprises a contact device 160, which during welding is in close proximity to the work piece to be welded. The contact device 160 holds a wire assembly 170 comprising the wires 4, 22, 12 (only the cold wire 22 is shown in FIG. 2). The wires 4, 22, 12 exit the contact device 160 through an outlet 162 at the lower end of the contact device 160, which lower end faces the work piece during the welding operation. The wires 4, 22, 12 may be fed from respective reservoirs such as coils (not shown) towards the arc welding head 100.

As mentioned above, the wire assembly 170 comprises two hot wires 4, 12 and a cold wire 22 arranged in the contact device 160. The hot wires 4, 12 are arranged as so called twin wires, which are fed in parallel as a double wire arrangement.

Above the contact device 160 a feeder means 150 is arranged which feeds the hot wires 4, 12 towards the contact device 160. Typically, the feeder means 150 comprises grooved wheels which move the hot wires 4, 12 towards the contact device 160. The feeder means 150 comprises an electrically insulating portion 156 for feeding through the cold wire 22. The electrically insulating portion 156 can consist of feeder wheels with an extra insulated groove for the cold wire 22. The cold wire 22 can pass through the wire feeding means 150 freely. The feeder wheels are driven by a driving unit 152, e.g. an electric motor.

The flux hopper 11 feeds granular flux to the contact device 160 via a nozzle (not shown).

Besides the driving unit 152 the wire feeding means 150 comprises a gear with a drive shaft. On the drive shaft of the gear a feeding wheel 154 (FIG. 5) is arranged, which can be pressurized by another wheel (not shown). The feeding wheel 154 drives the wire forward in the direction of the contact device 160.

Above the wire feeding means 150 a wire straightening unit 140 is arranged for straightening the hot wires 4, 12. Two rollers depicted in a foremost position of the wire straightening unit 140 are used to exert a pressure on three fixed wheels arranged vertically one over the other in the rear part of the wire straightening device. The pressure the rollers are exerting on the wheels is adjustable via knobs at the outside of the wire straightening unit 140. The pressure of the rollers on the three wheels is straightening the wire. The wire straightening unit 140 comprises an electrically insulating portion 146 through which the cold wire 22 can pass freely through the wire straightening unit 140.

Above the wire straightening unit 140 a separate wire feeding means 35 is disposed for feeding the cold wire 22 towards the contact device 160. On the wire feeding means 35 a driving unit 132, e.g. an electric motor, is arranged which drives feeder wheels of the wire feeding means 35. Besides the driving unit 132, the wire feeding means 35 comprises a gear with a drive shaft. On the drive shaft of the gear a feeding wheel 134 (FIG. 5) is arranged which can be pressurized by another wheel (not shown). The feeding wheel 134 drives the wire electrode forward in the direction of the contact device 160.

Above the wire feeding means 35 a separate wire straightening unit 120 is arranged for straightening the cold wire 22. Thus, along the longitudinal extension of the welding head 100 an electrically insulating duct 180 is provided for guiding the cold wire 22 from a wire reservoir such as a wire bobbin (not shown) to the contact nozzle. Between the feeder means 150 and 130 and above the wire straightening unit 120 an electrically insulated wire conduit can be arranged which receives the cold wire 22.

Particularly, the electrically insulating duct 180 consists of the electrically insulating portion 146 of the wire straightening unit 140, the electrically insulating portion 156 of the wire feeding means 150 for the non-insulated hot wires 4, 12, and the electrically insulated portion of the contact device 160 as well as electrically insulated wire conduits between the units 130, 140, 150, 160 and above the wire straightening unit 120 for the electrically insulated cold wire 22.

A detailed description of suitable contact devices for the hot and cold wires is provided in, for example, WO 2012/041375 A1.

As mentioned above, the arc welding apparatus 1 is provided with a sensor 27 (see FIG. 1) for measuring the hot wire 4 feed speed. Alternatively, the hot wire feed speed can be measured by means of a pulse sensor (not shown) that counts the rotations of a hot wire coil. The sensor sends this information to the control unit 31, which calculates a hot wire feed speed based on the number of rotations during a predetermined period of time and an estimated diameter of the hot wire coil. It is possible to provide a sensor for measuring the diameter of the hot wire coil.

Figure 5:
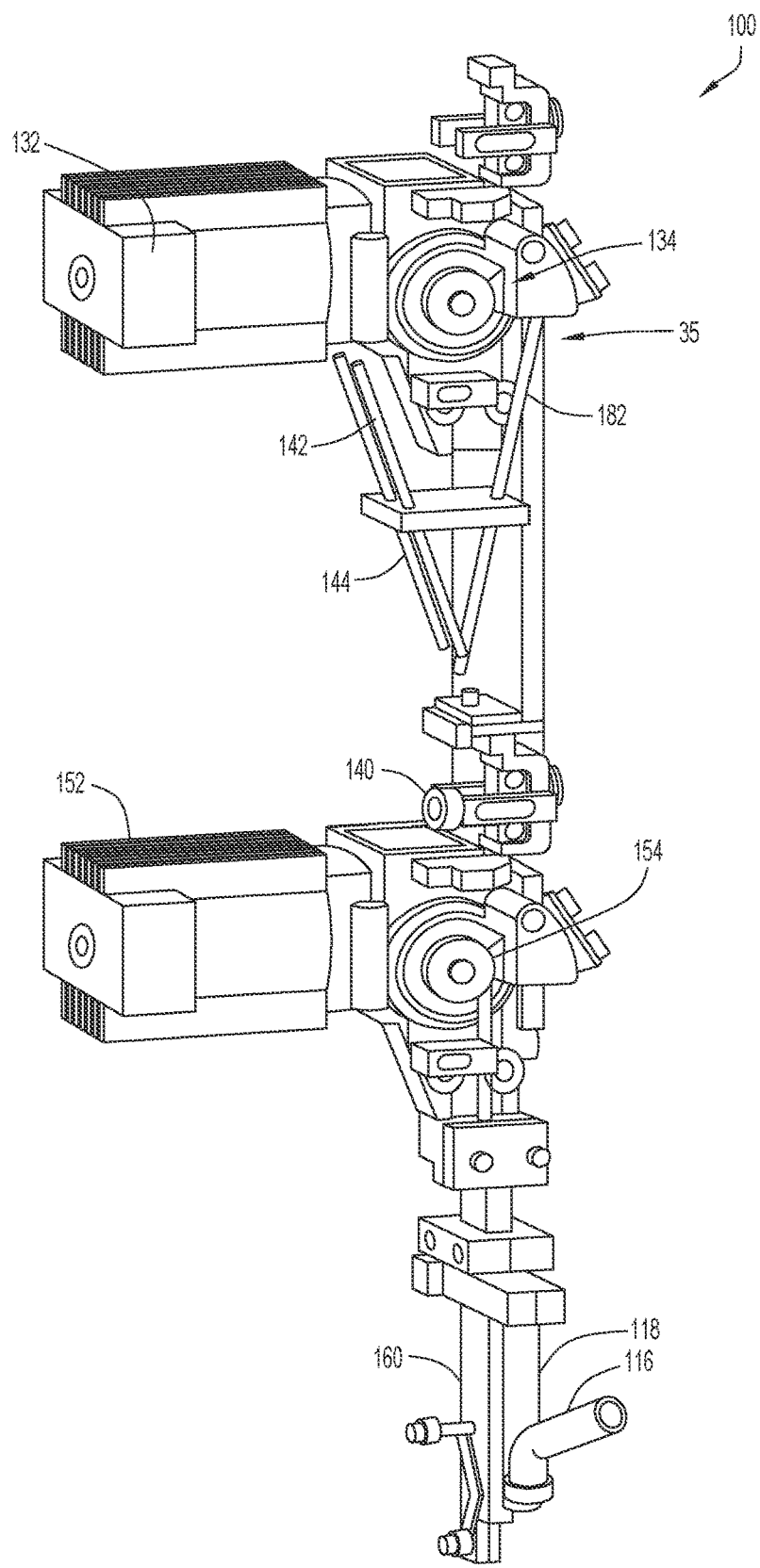
FIG. 5 shows a side view of an example embodiment of an arc-welding welding head

FIG. 5 is a side view of an arc-welding welding head 100 of virtually the same layout as shown in FIGS. 2-4. Above the wire straightening unit 140 two guide tubes 142, 144 are provided for twin wires. The guide tubes 142, 144 are arranged crosswise to the longitudinal extension of the welding head 100. Between the wire feeding means 35 for the cold wire (not shown) and the wire straightening unit 140 for the hot wires (not shown) a guide tube 182 for the cold wire is arranged. The driving units 132, 152 can be equipped with pulse sensors for speed control of the wires. Close to the contact device 160 a nozzle 116 for a flux hopper 114 (FIGS. 2-4) is arranged, the nozzle 116 is fixed to a rod 118 arranged parallel to the longitudinal axis of the contact device 160.

Figure 6A:
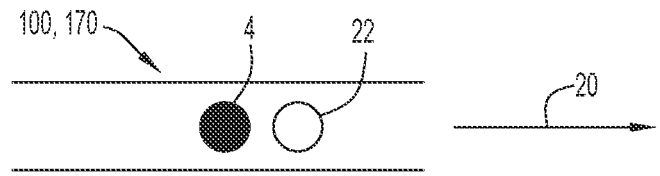
FIG. 6a-c show different arrangements of hot wires and cold wires.
Figure 6B:
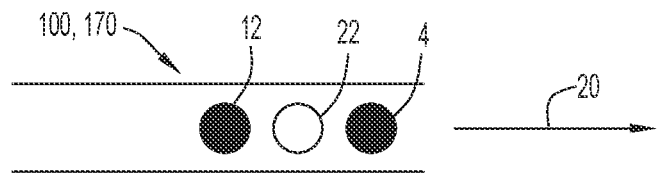
Figure 6C:
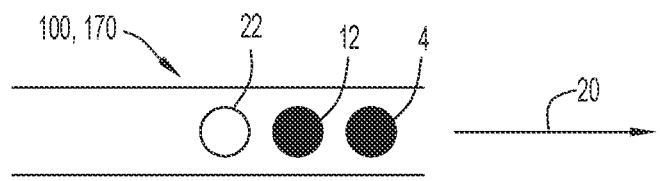

FIGS. 6*a*-*c* display arrangements of hot and cold wires 4, 12, 22 in electrode assemblies 170 with respect to a welding direction 20.

FIG. 6*a* shows a first variant of an electrode assembly 170 with a first hot wire 4 arranged behind a cold wire 22, as seen in the welding direction 20.

The cold wire 22 feed speed can be adjusted in dependence on an active welding parameter related to the first hot wire 4. Examples of suitable active welding parameters are hot wire feed speed, welding current and arc voltage. It is also possible to adjust the cold wire 22 feed speed in dependence on a plurality of active welding parameters related to the first hot wire 4. For example, it is possible to measure welding current, welding speed and arc voltage and make the cold wire 22 feed speed dependent on the heat input (equation 3).

A second variant of an electrode assembly 170 is shown in FIG. 6*b*, comprising a cold wire 22 located between two hot wires 4, 12 connected to a common power source (not shown).

A sensor (not shown) is suitably provided to measure an active welding parameter for only one of the hot wires 4, 12. The identical hot wires 4, 12 are for measurement purposes viewed as a single hot wire. The cold wire 22 feed speed is determined as described with reference to FIG. 6*a*.

A third variant of an electrode assembly 170 is shown in FIG. 6*c*, comprising two hot wires 4, 12 located in front of a cold wire 22 as seen in the welding direction 20. The hot wires are connected to separate power sources (not shown).

The cold wire 22 feed speed can be determined in a plurality of ways. It is possible to measure a first active welding parameter related to the first hot wire 4 and a second active welding parameter related to the second hot wire 12. The first and second active welding parameters are of the same type and each cold wire 22 feed speed target value corresponds to a mean value of first and second active welding parameter values. It is also possible to weigh the measured active welding parameter values before a mean value is calculated. It may, for example, be desirable to increase the influence of the second hot wire 12 on the cold wire 22 feed speed when the second hot wire 12 is connected to an AC power source and the first hot wire 4 is connected to a DC power source. Alternatively, one may measure active welding parameters of different types and use these to calculate target values for the cold wire 22 feed speed.

Figure 7A:
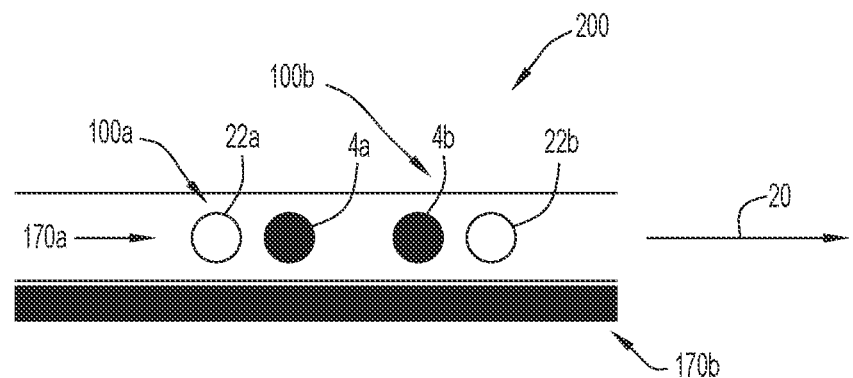
FIG. 7a-c show different arrangements of two arc welding heads comprising hot and cold wires.
Figure 7B:
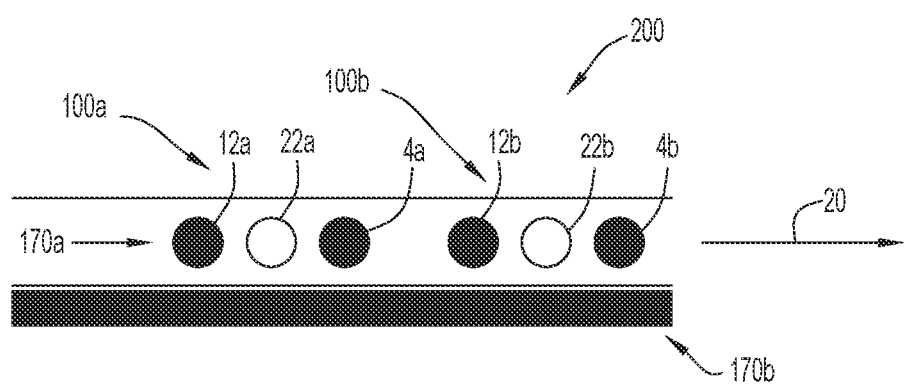
Figure 7C:
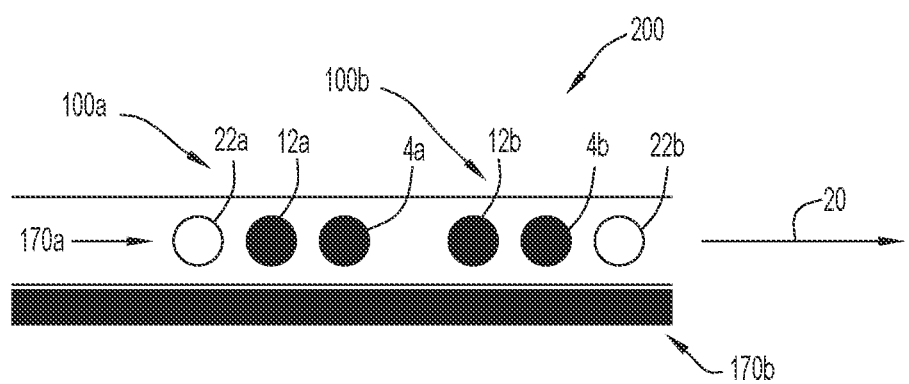

FIGS. 7*a* to 7*c* show arrangements of a welding head assembly 200 comprising two arc-welding welding heads 100*a*, 100*b*. Each welding head 100*a*, 100*b* comprises an electrode assembly 170*a*, 170*b* with a cold wire 22*a*, 22*b* and one or more hot wires 4*a*, 4*b*, 12*a*, 12*b*.

FIG. 7*a* is a first variant of a welding head assembly 200 wherein each welding head 100*a*, 100*b* comprises one hot wire 4*a*, 4*b* and one cold wire 22*a*, 22*b*. The cold wires 22*a*, 22*b* are the outermost wires in the welding head assembly 200.

The welding heads 100*a*, 100*b* are connected to separate power sources (not shown). The feed speed of the cold wire 22*a* in the first welding head 100*a* is dependent on one or more active welding parameters related to the hot wire 4*a* in the first welding head 100*a*. The feed speed of the cold wire 22*b* in the second welding head 100*b* is dependent on one or more active welding parameters related to the hot wire 4*b* in the second welding head 100*b*.

A second variant is shown in FIG. 7*b*, where each welding head 100*a*, 100*b* comprises a wire assembly 170*a*, 170*b* with three wires 4*a*, 22*a*, 12*a*, 4*b*, 22*b*, 12*b*, wherein each cold wire 22*a*, 22*b* is arranged in the middle between two hot wires 4*a*, 12*a*, 4*b*, 12*b*. The second welding head 100*b* is the leading welding head, as seen in the welding direction 20.

The first welding head 100*a* is connected to an AC power source (not shown) and the second welding head 100*b* is connected to a DC power source (not shown). The feed speed of the cold wire 22*a* in the first welding head 100*a* is advantageously dependent on one or more active parameters related to one or both of said first and second hot wires 4*a*, 12*a* in said first welding head 100*a*, and the feed speed of the cold wire 22*b* in the second welding head 100*b* is advantageously dependent on one or more active parameters related to one or both of said first and second hot wires 4*b*, 12*b* in said second welding head 100*b*.

FIG. 7*c* shows a third variant with three wires 4*a*, 4*b*, 12*a*, 12*b*, 22*a*, 22*b* in each welding head 100*a*, 100*b*, with the cold wires 22*a*, 22*b* being located at the outside of the welding head assembly 200. The first welding head 100*a* is connected to an AC power source whereas the second welding head 100*b* is connected to a power source arranged to switch from DC to AC during welding.

During the first lap, the feed speeds of the cold wires 22*a*, 22*b* are determined as described above with reference to FIG. 7*b*. During the second lap, active parameter values of the same type are measured for all four hot wires 4*a*, 4*b* and 22*a*, 22*b* and the cold wire 22*a*, 22*b* feed speed target values are adjusted in dependence on corresponding mean values of said active parameter values.

There are many possible ways to determine target values for one or more cold wires, only some of which are described above. The scope of protection is not limited to the above described embodiments, which can be combined and modified in many different ways without departing from the scope of protection.

Alternative embodiments may also comprise two or more control units and a plurality of measuring means in the form of, for example, speed sensors, pulse sensors, measuring cables and shunts.

Below follows, with reference to FIGS. 8*a*, 8*b*, a description of two exemplary and alternative embodiments of a method for controlling a submerged arc welding process or, more specifically, for controlling cold wire feed speed in a submerged arc welding process.

For purpose of clarity, the following description shows how the feed speed of a single cold wire can be adjusted in dependence on the feed speed of a single hot wire (see FIG. 6a). The hot wire feed speed is adjusted to maintain the arc voltage essentially constant (CA). The skilled person appreciates that the principles are general and apply also when the feed speeds of one or more cold wires are controlled in dependence on one or more active welding parameters (of any type) related to one or more hot wires. The skilled person also understands that the principles can be applied to other types of welding process, e.g. CW and CC.

Figure 8A:
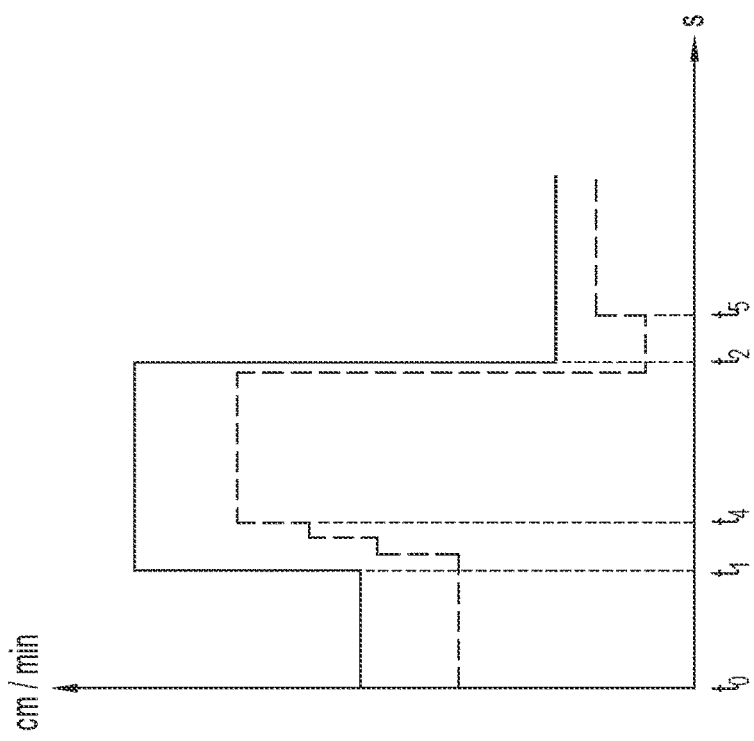
FIG. 8a-8b graphically show possible relations between a cold wire feed speed and a variable active welding parameter.
Figure 8B:
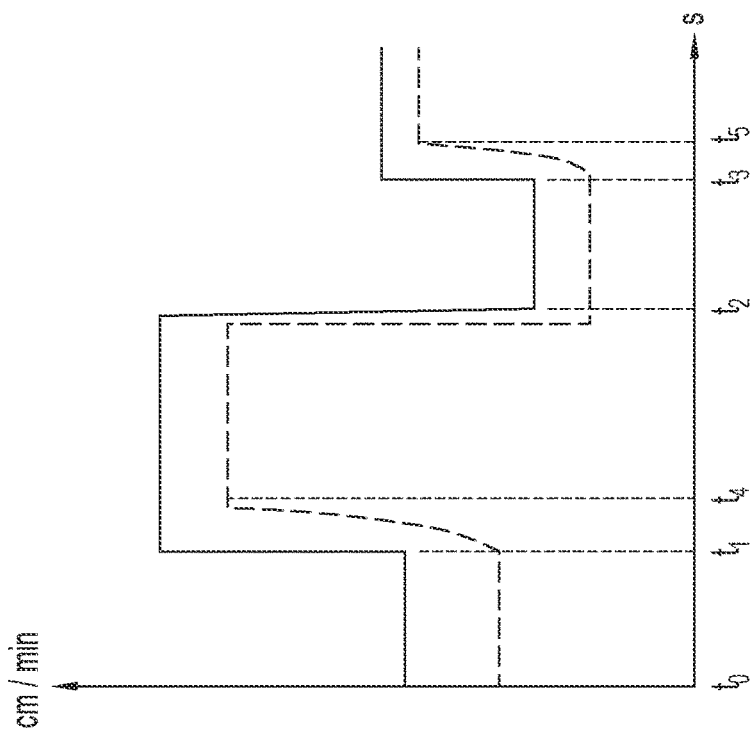

The skilled person understands that the curves shown in FIGS. 8a and 8b are not exact representations of suitable hot and cold wire feed speed variations. However, the curves show the general principles behind the method according to the invention.

FIG. 8a is a diagram that shows how the hot wire feed speed (solid line) changes over time. The diagram also shows how the cold wire feed speed (dashed line) follows the hot wire feed speed.

The hot wire feed speed is continuously measured and the measured values are filtered in the control unit. For each filtered value, the control unit determines a corresponding feed speed target value for the cold wire and the cold wire feeding means adjusts the cold wire feed speed to said target value. The control unit also compares said target value to the current cold wire feed speed value. As will now be shown, the procedure for adjustment of the cold wire feed speed depends on the outcome of said comparison.

Initially, the hot wire feed speed is essentially constant ($t_0$-$t_1$). Then there is a disturbance, and the welding current transferred through the hot wire drops, e.g. as a consequence of an increased distance between the tip of the hot wire and the work piece. In order to restore the welding current to its previous value, the welding apparatus increases the hot wire feed speed ($t_1$) and the distance between the hot wire end and the work piece is reduced. Shortly thereafter ($t_2$) there is another disturbance that causes an increase of the welding current. Consequently, the hot wire feed speed is reduced, as before to restore the welding current to its previous value. Then the welding current is reduced again and the welding current is increased ($t_3$), so that the welding current is maintained at an essentially constant level over time.

The dashed line shows how the cold wire feed speed follows the variations in hot wire feed speed. At $t_1$, the hot wire feed speed sensor measures a hot wire feed speed value and this value is transferred to the control unit. The control unit calculates a corresponding target value for the cold wire feed speed and compares said target value to the current cold wire feed speed value. An upcoming increase of the cold wire feed speed is recognised and the control unit determines a suitable gradient for the increase of the cold wire feed speed. Thereafter, the control unit sends a signal to the cold wire feeding means, which slowly increases the cold wire feed speed ($t_1$-$t_4$) to its target value. The time delay ($t_1$-$t_4$) ensures that the arc is stabile when the cold wire reaches its target feed speed. The sensor continues to measure and transfer hot wire feed speed values to the control unit and after a while ($t_2$) the control unit registers a sudden reduction of the hot wire feed speed. The new hot wire feed speed corresponds to a target value for the cold wire feed speed lower than the current cold wire feed speed. The control unit directs the cold wire feeding means to immediately reduce the cold wire feed speed to the determined target value, to prevent the cold wire from hitting the bottom of the weld puddle. Soon thereafter ($t_3$), the control unit identifies yet another increase of the hot wire feed speed and the cold wire feed speed is adjusted accordingly, slowly increasing until it reaches its new target value ($t_5$).

Alternatively, the sensor may be adapted to measure the current and the current values are used to determine new feed speed values for both the hot wire and the cold wire.

The hot wire feed speed curve in FIG. 8b is, for the most part ($t_0$-$t_2$), identical to the hot wire feed speed curve in FIG. 8a. However, the hot wire feed speed remains at the reduced level following the reduction thereof ($t_2$).

The cold wire feed speed is increased in steps ($t_1$-$t_4$) having a length (ms) and height (cm/min) determined by the control unit. When the hot wire feed speed drops ($t_3$), the cold wire feed speed is first reduced to a value below the cold wire feed speed target value and remains at this level for a period of time ($t_2$-$t_5$), determined by the control unit, before it is increased to its target value ($t_5$) in a single step.

In alternative embodiments, the cold wire feed speed may be increased in steps following the reduction of the cold wire feed speed. It is also possible to delay the initiation of the increase of the first cold wire feed speed increase. Any combination of the embodiments described above is covered by the scope of protection provided by the claims.

The sensor measures the hot wire feed speed at predetermined intervals. Advantageously, should the sensor, during an increase or reduction of the cold wire feed speed, register a new hot wire feed speed value that differs from the last detected hot wire feed speed value, then the control unit determines a new target value for the cold wire feed speed. The new target value replaces the current target value. That is, the cold wire feeding means is immediately instructed to adjust the cold wire feed speed to the new target value (of course, there may be a delay, as shown in FIGS. 8a, 8b, before the cold wire feed speed reaches its new target value). The control unit may also determine a new gradient for an increase of the cold wire feed speed as well as new time delays and heights and lengths of any adjustment steps.

The scope of protection provided by the claims is not limited to the embodiments described above. Embodiments and features can be combined in many ways without falling outside the scope of protection. For example, the system 9 shown in FIG. 1 may comprise means for measuring arc voltage. The control unit shown in FIG. 1 may also be adapted to control more than one cold wire. FIGS. 8a and 8b can be adapted to show the relationship between arc voltage and cold wire feed speed. The increase in cold wire feed speed in FIG. 8a may be delayed by a period of time determined by the control unit.

The invention claimed is:

1. A submerged arc welding apparatus, comprising:
   a first wire feeder feeding a first hot wire towards a workpiece;
   a first contact tube transferring current to the first hot wire for arc generation to create a weld puddle;
   a second wire feeder feeding a cold wire at a variable feed speed towards the weld puddle, wherein the cold wire is configured such that no arc is generated between the cold wire and the workpiece;
   one or more sensors configured to continuously measure, during a welding phase, at least a first active welding parameter related to at least the first hot wire, wherein the at least a first active welding parameter is continuously adapted to existing welding conditions; and
   a control unit configured to:
   continuously determine different target values for the variable feed speed of the cold wire based on different values of the at least a first active welding parameter, wherein the control unit determines a different target value for the variable feed speed of the cold wire according to a different value of the at least a first active welding parameter; and adjust the variable feed speed of the cold wire to the different target values.

2. The submerged arc welding apparatus of claim 1, wherein the at least a first active welding parameter is an active hot wire welding parameter.

3. The submerged arc welding apparatus of claim 2, wherein a first hot wire feed speed is the active hot wire welding parameter.

4. The submerged arc welding apparatus of claim 2, wherein a first hot wire welding current is the active hot wire welding parameter.

5. The submerged arc welding apparatus of claim 2, wherein a first hot wire arc voltage is the active hot wire welding parameter.

6. The submerged arc welding apparatus of claim 2, wherein a first hot wire welding power is the active hot wire welding parameter.

7. The submerged arc welding apparatus of claim 2, wherein a first hot wire heat input is the active hot wire welding parameter.

8. The submerged arc welding apparatus of claim 1, wherein:
the control unit determines a first target value in response to measurement of a first value of the at least a first active welding parameter; and
when the first target value indicates an increase of the variable feed speed of the cold wire, the control unit is configured to carry out the increase so that the variable feed speed of the cold wire reaches the first target value with a delay in time with respect to an occurrence of the first value of the at least a first active welding parameter.

9. The submerged arc welding apparatus of claim 1, wherein:
the control unit determines a first target value in response to measurement of a first value of the at least a first active welding parameter; and
when the first target value indicates a reduction of the variable feed speed of the cold wire, the control unit is configured to carry out the reduction so that the variable feed speed of the cold wire reaches the first target value within 200 ms of an occurrence of the first value of the at least a first active welding parameter.

10. The submerged arc welding apparatus of claim 9, wherein the variable feed speed of the cold wire is initially reduced to a value below the first target value and then increased to the first target value.

11. The submerged arc welding apparatus of claim 1, further comprising:
a third wire feeder feeding a second hot wire towards the workpiece; and
a second contact tube for transferring current to the second hot wire for arc generation so that the first hot wire and the second hot wire create a single weld puddle,
wherein the control unit is further configured to:
continuously measure, during a welding phase, at least a second active welding parameter related to the second hot wire, wherein the at least a second active welding parameter is continuously adapted to the existing welding conditions; and
adjust the variable feed speed of the cold wire in dependence on variations in the at least a first active welding parameter and the at least a second active welding parameter.

12. A submerged arc welding apparatus, comprising:
a first wire feeder feeding a first hot wire towards a workpiece;
a first contact tube transferring current to the first hot wire for arc generation to create a weld puddle;
a second wire feeder feeding a cold wire at a variable feed speed towards the weld puddle, wherein the cold wire is configured such that no arc is generated between the cold wire and the workpiece;
one or more sensors configured to measure, during a welding phase, at least a first active welding parameter related to at least the first hot wire, wherein the at least a first active welding parameter is continuously adapted to existing welding conditions; and
a control unit configured to:
in response to detection of a variation of the at least a first active welding parameter, determine a target value for the variable feed speed of the cold wire based on the variation of the at least a first active welding parameter; and
adjust the variable feed speed of the cold wire to the target value, wherein when the target value indicates an increase of the variable feed speed of the cold wire, wherein the control unit is configured to carry out the increase so that the variable feed speed of the cold wire reaches the target value with a delay in time with respect to the detection of the variation of the at least a first active welding parameter.

13. The submerged arc welding apparatus of claim 12, wherein when the target value indicates a reduction of the variable feed speed of the cold wire, the control unit is configured to carry out the reduction so that the variable feed speed of the cold wire reaches the target value within 200 ms of the detection of the variation of the at least a first active welding parameter.

14. The submerged arc welding apparatus of claim 13, wherein when carrying out the reduction, the variable feed speed of the cold wire is initially reduced to a value below the target value and then increased to the target value.

15. The submerged arc welding apparatus of claim 12, wherein the control unit is further configured to:
continuously measure, during the welding phase, the at least a first active welding parameter related to the first hot wire;
in response to detection of a plurality of variations of the at least a first active welding parameter, determine target values for the variable feed speed of the cold wire based on the plurality of variations of the at least a first active welding parameter, wherein the control unit determines a different target value for the variable feed speed of the cold wire according to a different value of the at least a first active welding parameter; and
adjust the variable feed speed of the cold wire to the target values.

16. The submerged arc welding apparatus of claim 12, wherein the at least a first active welding parameter includes one of a first hot wire feed speed, a first hot wire welding current, a first hot wire arc voltage, a first hot wire welding power, or a first hot wire heat input.

17. A submerged arc welding apparatus, comprising:
a first wire feeder feeding a first hot wire towards a workpiece;

a first contact tube transferring current to the first hot wire for arc generation to create a weld puddle;

a second wire feeder feeding a cold wire at a variable feed speed towards the weld puddle, wherein the cold wire is configured such that no arc is generated between the cold wire and the workpiece;

one or more sensors configured to measure, during a welding phase, at least a first active welding parameter related to at least the first hot wire, wherein the at least a first active welding parameter is continuously adapted to existing welding conditions; and a control unit configured to:

in response to detection of a variation of the at least a first active welding parameter, determine a target value for the variable feed speed of the cold wire based on the variation of the at least a first active welding parameter, wherein the target value indicates a reduction of the variable feed speed of the cold wire; and adjust the variable feed speed of the cold wire to the target value so that the variable feed speed of the cold wire reaches the target value within 200 ms of the detection of the variation of the at least a first active welding parameter.

18. The submerged arc welding apparatus of claim 17, wherein the variable feed speed of the cold wire is initially reduced to a value below the target value and then increased to the target value.

19. The submerged arc welding apparatus of claim 17, wherein the control unit is further configured to:

continuously measure, during the welding phase, the at least a first active welding parameter related to the first hot wire;

in response to detection of a plurality of variations of the at least a first active welding parameter, determine target values for the variable feed speed of the cold wire based on the plurality of variations of the at least a first active welding parameter, wherein the control unit determines a different target value for the variable feed speed of the cold wire according to a different value of the at least a first active welding parameter; and adjust the variable feed speed of the cold wire to the target values.

20. The submerged arc welding apparatus of claim 17, wherein the at least a first active welding parameter includes one of a first hot wire feed speed, a first hot wire welding current, a first hot wire arc voltage, a first hot wire welding power, or a first hot wire heat input.

* * * * *